US009230293B2

(12) United States Patent
Nakada et al.

(10) Patent No.: US 9,230,293 B2
(45) Date of Patent: Jan. 5, 2016

(54) DISPLAY CONTROLLING PROGRAM AND DISPLAY CONTROLLING APPARATUS

(75) Inventors: Ryuichi Nakada, Kyoto (JP); Takeshi Ando, Kyoto (JP); Masayuki Taira, Kyoto (JP); Sensuke Obata, Kyoto (JP)

(73) Assignee: NINTENTO CO., LTD., Kyoto (JP)

( * ) Notice: Subject to any disclaimer, the term of this patent is extended or adjusted under 35 U.S.C. 154(b) by 1268 days.

(21) Appl. No.: 12/582,839

(22) Filed: Oct. 21, 2009

(65) Prior Publication Data
US 2010/0182228 A1    Jul. 22, 2010

(30) Foreign Application Priority Data

Jan. 21, 2009    (JP) ................................. 2009-011108

(51) Int. Cl.
*G09G 5/00* (2006.01)
*G06T 1/00* (2006.01)

(52) U.S. Cl.
CPC ....................................... *G06T 1/00* (2013.01)

(58) Field of Classification Search
None
See application file for complete search history.

(56) References Cited

U.S. PATENT DOCUMENTS

| 6,919,892 B1 * | 7/2005 | Cheiky et al. ................. 345/473 |
| 7,804,982 B2 * | 9/2010 | Howard et al. ............... 382/115 |
| 8,174,555 B2 * | 5/2012 | Border et al. ............. 348/14.01 |
| 8,601,379 B2 * | 12/2013 | Marks et al. ................... 715/757 |
| 2002/0145626 A1 * | 10/2002 | Richards et al. ............. 345/741 |
| 2003/0108241 A1 * | 6/2003 | Colmenarez et al. ......... 382/181 |
| 2004/0213437 A1 * | 10/2004 | Howard et al. ............... 382/115 |
| 2007/0172155 A1 * | 7/2007 | Guckenberger ............. 382/305 |
| 2008/0273765 A1 * | 11/2008 | Tsujimura ..................... 382/118 |
| 2008/0298766 A1 * | 12/2008 | Wen et al. ........................ 386/46 |
| 2009/0097757 A1 * | 4/2009 | Wimsatt ........................ 382/190 |
| 2012/0081500 A1 * | 4/2012 | Border et al. ............. 348/14.02 |
| 2014/0018172 A1 * | 1/2014 | Collard et al. .................. 463/36 |

FOREIGN PATENT DOCUMENTS

| JP | 2002-159745 | 6/2002 |
| JP | 2003-060956 | 2/2003 |
| JP | 2003-198677 | 7/2003 |
| JP | 2004-258819 | 9/2004 |
| JP | 2008-027086 | 2/2008 |

OTHER PUBLICATIONS

Machine level English Translation of Mitsufumi et al. (JP_2003-060956).*
Dec. 11, 2012, Japanese Office Action for JP2009-011108, 3 pages.

* cited by examiner

*Primary Examiner* — Tracy Li
*Assistant Examiner* — Mohammad J Rahman
(74) *Attorney, Agent, or Firm* — Nixon & Vanderhye P.C.

(57) ABSTRACT

An information processing apparatus includes a computer. The computer subsequently images a user, makes an evaluation of first image data indicating an image obtained by subsequently imaging, and displays the evaluation result on an LCD by subsequently updating the same.

16 Claims, 27 Drawing Sheets

FIG. 6
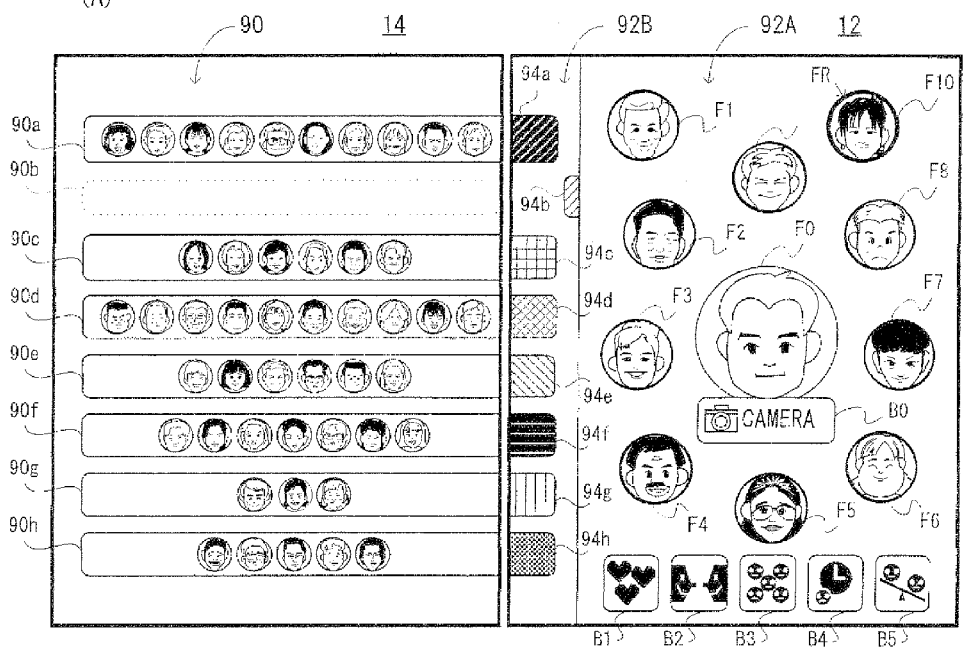
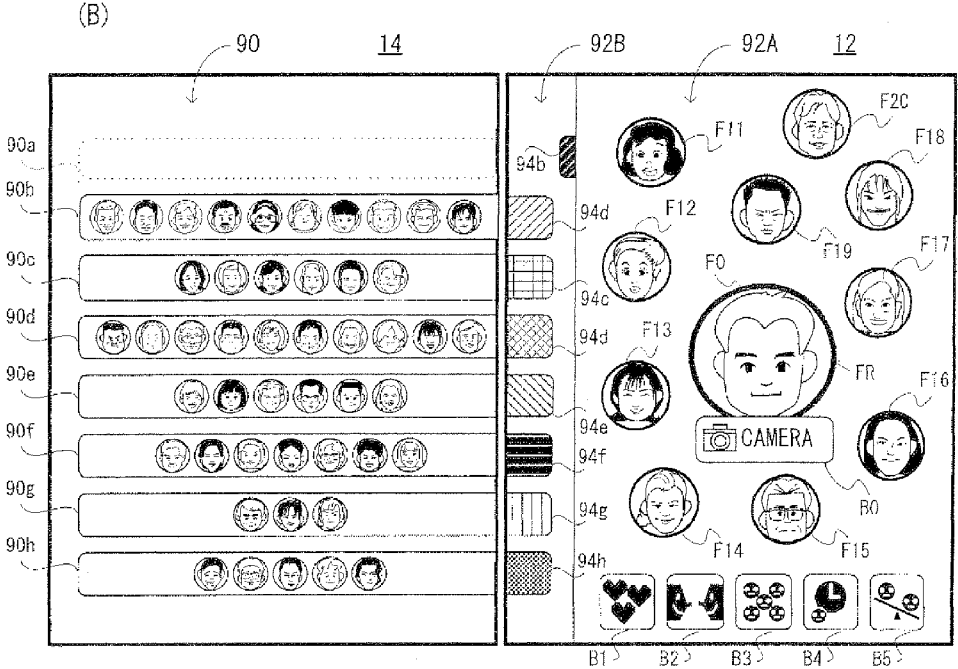

FIG. 7
(A)
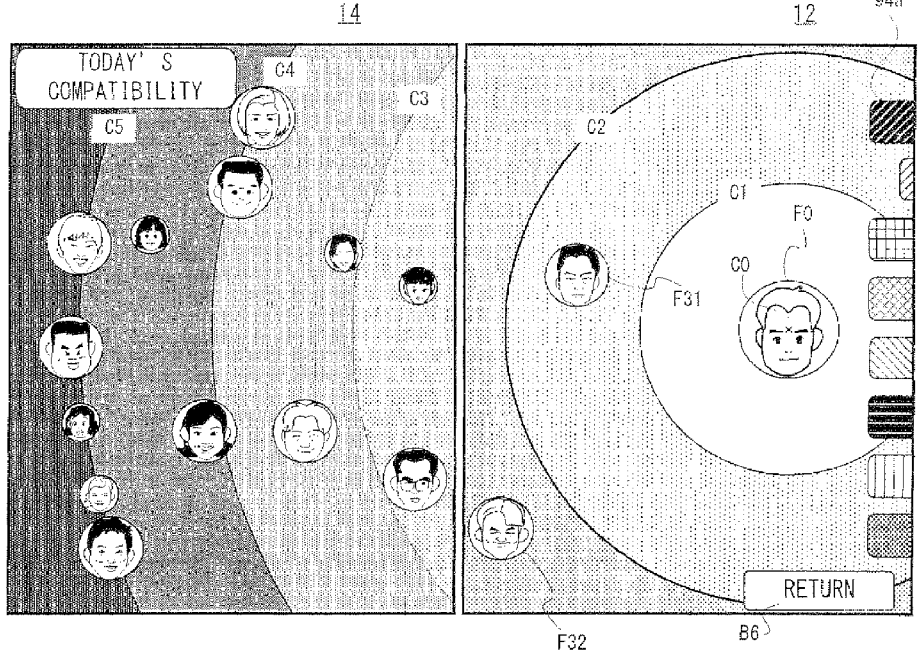
(B)
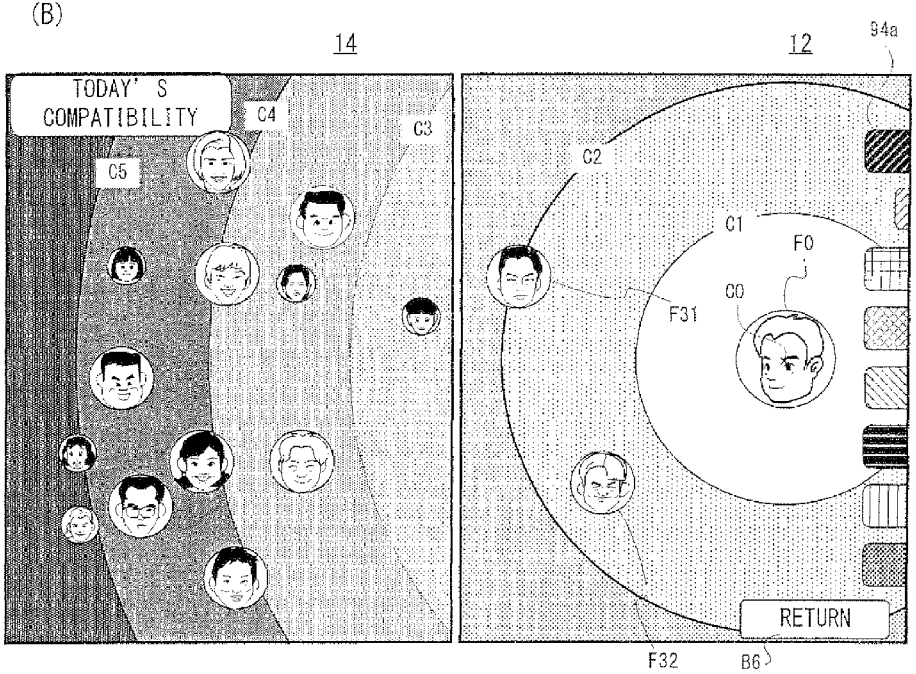

FIG. 10
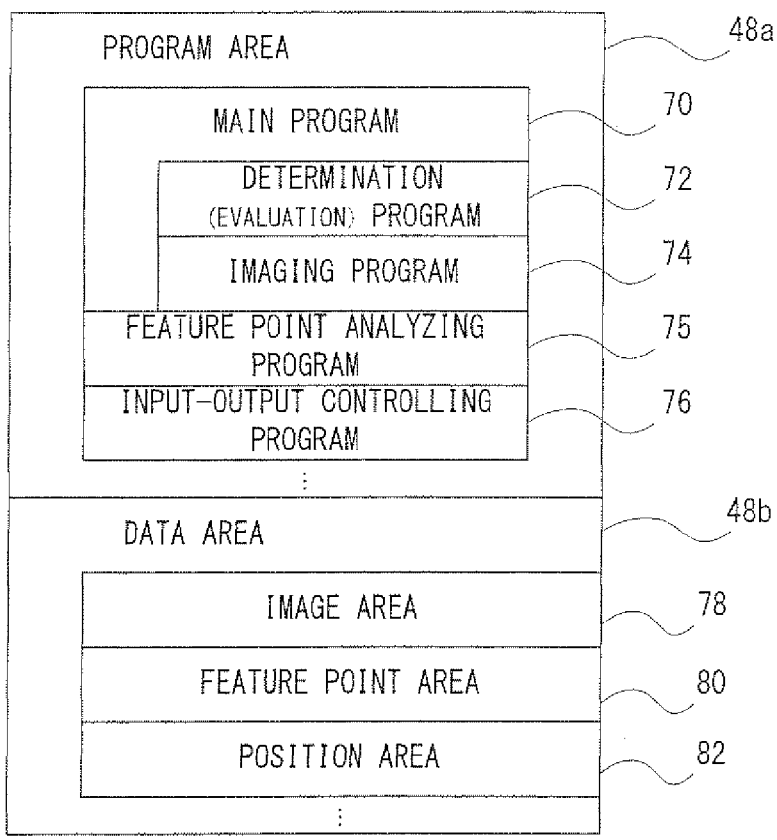
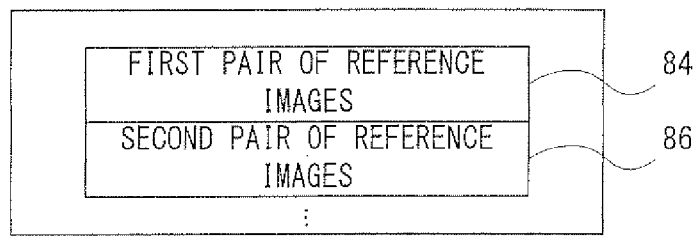

DISPLAY CONTROLLING PROGRAM AND DISPLAY CONTROLLING APPARATUS

CROSS REFERENCE OF RELATED APPLICATION

The disclosure of Japanese Patent Application No. 2009-11108 is incorporated herein by reference.

BACKGROUND

Technical Field

The technology presented herein relates to an information processing program and an information processing apparatus. More specifically, the present technology relates to an information processing program and an information processing apparatus which are able to evaluate a user by utilizing an image obtained by imaging the user.

Description of the Related Art

As conventional apparatus and program of such a kind, a digital camera disclosed in Japanese Patent Application Laid-Open No. 2003-60956 (Patent Document 1) is widely known. In the background art, the digital camera images a user to store the image data in an internal memory, and by utilizing the image data stored in the internal memory, a person's fortune is told by physiognomy, and a person's compatibility is checked on the basis of the result of the judgment by physiognomy of the imaged user and the result of the judgment by physiognomy of the image data of others stored in advance.

However, in the background art of the Patent Document 1, the evaluation results of the judgment by physiognomy and the check of the compatibility are based on the image data obtained by imaging, so that there are problems of requiring a complex operation, such as imaging again and selecting images which has been imaged in advance in a case that the user wants to know the evaluation result by utilizing the image data indicating images in various manners (image data obtained by imaging in different expressions and angles, for example).

SUMMARY

Therefore, it is a primary feature of the present technology to provide a novel display controlling program and display controlling apparatus.

Another feature of the present technology is to provide an information processing program and an information processing apparatus which are able to inform a user of an evaluation result by utilizing image data indicating images in various manners without a complex operation.

The present technology employs following configurations in order to solve the above-described problems.

A first embodiment is an information processing program, and the information processing program causes a computer of an information processing apparatus to execute an imaging step for subsequently imaging a user with a camera, an evaluating step for making an evaluation of first image data indicating an image obtained through the subsequent imaging by the imaging step, and an evaluation result displaying step for displaying an evaluation result on a screen by the evaluating step through subsequent updating.

In the first embodiment, an information processing program causes a computer of an information processing apparatus to execute an imaging step, an evaluating step, and an evaluation result displaying step. The computer subsequently images a user in the imaging step, and makes an evaluation of first image data indicating the image obtained through the subsequent imaging by the imaging step in the evaluating step. The evaluation result displaying step displays an evaluation result on a screen by the evaluating step through subsequent updating.

According to the first embodiment, the user is imaged in real time, an evaluation is made based on the obtained real-time image, and the evaluation result is displayed by subsequent updating, capable of informing the user of the evaluation result with respect to images in various manners.

A second embodiment is an information processing program, and the information processing program causes the computer to further execute a storing step for previously storing second image data indicating an image of a party to be evaluated, and the evaluating step evaluates a relationship between the user and the party to be evaluated on the basis of the first image data indicating the image obtained through the subsequent imaging by the imaging step and the second image data stored in the storing step.

In the second embodiment, an information processing program causes a computer to further execute a storing step. The computer previously stores second image data indicating an image of a party to be evaluated in the storing step. In the evaluating step, a relationship between the user and the party to be evaluated is evaluated on the basis of the first image data indicating the image obtained through subsequent imaging by the imaging step and the second image data stored in the storing step.

According to the second embodiment, the relationship between the user and the party to be evaluated is evaluated by imaging the user in real time, capable of informing the user of the relationship with the party to be evaluated which changes from time to time.

A third embodiment is an information processing program, and the evaluation result displaying step moves and displays the image obtained through the subsequent imaging by the imaging step on the basis of the evaluation result by the evaluating step.

According to the third embodiment, a through image is moved according to the evaluation result with respect to the data indicating the image obtained through the subsequent imaging, capable of easily informing the user of the evaluation result.

A fourth embodiment is an information processing program, and the evaluation result displaying step moves and displays the image of the party to be evaluated on the basis of the evaluation result by the evaluating step.

According to the fourth embodiment, the image of the party to be evaluated is moved according to the evaluation results as to the user of the image obtained through the subsequent imaging and the party to be evaluated, capable of easily informing the user of the evaluation result.

A fifth embodiment is an information processing program, and the information processing program causes the computer to further execute a map displaying step for displaying map in association with an evaluation content made by the evaluating step on the screen, and a mapping step for mapping the image obtained by the imaging step through the subsequent imaging at a position on the map corresponding to the evaluation result by the evaluating step.

In the fifth embodiment, an information processing program causes a computer to further execute a map displaying step and a mapping step. The computer displays map in association with an evaluation content made by the evaluating step on the screen in the map displaying step, and maps the image obtained by the imaging step through the subsequent imaging at a position on the map corresponding to the evaluation result by the evaluating step in the mapping step.

According to the fifth embodiment, a display position on the map is decided according to the evaluation result, capable of easily informing the user of the evaluation result.

A sixth embodiment is an information processing program, the information processing program causes the computer to further execute a display position deciding step for deciding a position corresponding to a position on an axis in association with an evaluation content within the screen on the basis of the evaluation result by the evaluating step, and the evaluation result displaying step displays an image in association with the evaluation content at a predetermined position on the axis, and displays the image obtained through the subsequent imaging by the imaging step at the position decided by the display position deciding step.

In the sixth embodiment, an information processing program causes a computer to further execute a display position deciding step. The computer decides a position corresponding to a position on an axis in association with an evaluation content within the screen on the basis of the evaluation result by the evaluating step in the display position deciding step, and displays an image in association with the evaluation content at a predetermined position on the axis, and displays the image obtained through the subsequent imaging by the imaging step at the position decided by the display position deciding step in the evaluation result displaying step.

According to the sixth embodiment, the display position on the axis can be decided according to the evaluation result, capable of easily informing the user the evaluation result.

A seventh embodiment is an information processing program, and the information processing program causes the computer to further execute a display target position deciding step for deciding a target position corresponding to a position on an axis in association with an evaluation content within the screen on the basis of the evaluation result by the evaluating step, and the evaluation result displaying step displays an image in association with the evaluation content at a predetermined position on the axis, and gradually moving the image obtained through the subsequent imaging by the imaging step toward the target position decided by the display target position deciding step, and displaying the same.

In the seventh embodiment, an information processing program causes a computer to further execute a display target position deciding step. The computer decides a target position corresponding to a position on an axis in association with an evaluation content within the screen on the basis of the evaluation result by the evaluating step in the display target position deciding step, displays an image in association with the evaluation content at a predetermined position on the axis in the evaluation result displaying step, and gradually moves the image obtained through the subsequent imaging by the imaging step toward the target position decided by the display target position deciding step, and displays the same in the display target position deciding step.

According to the seventh embodiment, the through image is gradually moved toward the target position, capable of informing the user that the evaluation result is changing.

An eighth embodiment is an information processing program, and the information processing program causes the computer to further execute a display position deciding step for deciding a position to display the image obtained through the imaging by the imaging step on the basis of the evaluation result by the evaluating step and a predetermined position to display the image of the party to be evaluated, and the evaluation result displaying step displays the image of the party to be evaluated at the predetermined position, and displays the image obtained through the imaging by the imaging step at the position decided by the display position deciding step.

In the eighth embodiment, an information processing program causes a computer to further execute a display position deciding step. The computer decides a position to display the image obtained through the imaging by the imaging step on the basis of the evaluation result by the evaluating step and a predetermined position within the screen in the display position deciding step, and displays the image of the party to be evaluated at the predetermined position and displays the image obtained through the imaging by the imaging step at the position decided by the display position deciding step, in the evaluation result displaying step.

According to the eighth embodiment, the display positional relationship between the user and the party to be evaluated is decided according to the evaluation result, capable of easily informing the user of the evaluation result.

A ninth embodiment is an information processing program, and the information processing program causes the computer to further execute a display position deciding step for deciding a position to display the image of the party to be evaluated on the basis of the evaluation result by the evaluating step and a predetermined position within the screen, and the evaluation result displaying step displays the image obtained through the imaging by the imaging step at the predetermined position, and displays the image of the party to be evaluated at the position decided by the display position deciding step.

In the ninth embodiment, an information processing program causes a computer to further execute a display target position deciding step. The computer decides a position to display the image of the party to be evaluated on the basis of the evaluation result by the evaluating step and a predetermined position within the screen in the display target position deciding step, and displays the image obtained through the imaging by the imaging step at the predetermined position and displays the image of the party to be evaluated at the position decided by the display position deciding step, in the evaluation result displaying step.

According to the ninth embodiment, while a position to display an image of the party to be evaluated is decided, and the image is displayed there, the imaged image is displayed at the predetermined position, capable of informing the user of the evaluation result by taking the user's own image as a reference.

A tenth embodiment is an information processing program, and the information processing program causes the computer to further execute a display target position deciding step for deciding a target position to display the image obtained through the imaging by the imaging step on the basis of the evaluation result by the evaluating step and a predetermined position within the screen, and the evaluation result displaying step displays the image of the party to be evaluated at the predetermined position, and gradually moving the image obtained through the subsequent imaging by the imaging step toward the target position decided by the display target position deciding step and displaying the same.

In the tenth embodiment, an information processing program causes a computer to further execute a display target position deciding step. The computer decides a target position to display the image obtained through the imaging by the imaging step on the basis of the evaluation result by the evaluating step and a predetermined position within the screen in the display target position deciding step, and displays the image of the party to be evaluated at the predetermined position and gradually moving the image of the party to be evaluated toward the target position decided by the display target position deciding step and displays the same, in the evaluation result displaying step.

According to the tenth embodiment, the through image is gradually moved toward the target position, capable of informing the user that the evaluation result is changing.

An eleventh embodiment is an information processing program, and the information processing program causes the computer to further execute a display target position deciding step for deciding a target position to display the image of the party to be evaluated on the basis of the evaluation result by the evaluating step and a predetermined position within the screen, and the evaluation result displaying step displays the image obtained through the imaging by the imaging step at the predetermined position, and gradually moving the image of the party to be evaluated toward the target position decided by the display target position deciding step and displays the same.

In the eleventh embodiment, an information processing program causes a computer to further execute a display target position deciding step. The computer decides a target position to display the image of the party to be evaluated on the basis of the evaluation result by the evaluating step and a predetermined position within the screen in the display target position deciding step, and displays the image obtained through the imaging by the imaging step at the predetermined position and gradually moving the image of the party to be evaluated toward the target position decided by the display target position deciding step and displays the same, in the evaluation result displaying step.

According to the eleventh embodiment, the party to be evaluated is gradually moved toward the target position, capable of informing the user that the evaluation result is changing.

A twelfth embodiment is an information processing program, and the display position deciding step decides a position to display the image obtained through the imaging by the imaging step such that the predetermined position where the image of the party to be evaluated is displayed and the position where the image obtained through the imaging by the imaging step is displayed are close to each other with increases in relationship evaluated by the evaluating step.

According to the twelfth embodiment, a display is made to be close to the party to be evaluated in a case of a high relationship, capable of easily informing the user of a degree of the relationship (degree of relation).

A thirteenth embodiment is an information processing program, and the information processing program causes the computer to further execute a third image data storing step for previously storing third image data indicating an image of a person except for the user and an other person evaluating step for making an evaluation of the third image data stored in the third image data storing step, and the evaluation result displaying step moves and displays the image obtained through subsequent imaging by the imaging step on the basis of the evaluation result by the evaluating step, and moves and displays the image of the person except for the user on the basis of the evaluation result by the other person evaluating step.

In the thirteenth embodiment, an information processing program causes a computer to further execute a third image data storing step and an other person evaluating step. The computer previously store third image data indicating an image of a person except for the user in the third image data storing step. In the other person evaluating step, evaluation is made on the third image data stored in the third image data storing step. In the evaluation result displaying step, the image obtained through the subsequent imaging by the imaging step is moved and displayed on the basis of the evaluation result by the evaluating step, and the image of the person except for the user is moved and displayed on the basis of the evaluation result by the other person evaluating step.

According to the thirteenth embodiment, the image of the person except for the user can simultaneously be displayed, capable of easily informing the user of the relative evaluation result inclusive of other person.

A fourteenth embodiment is an information processing program, and the information processing program causes the computer to further execute a third image data storing step for previously storing third image data indicating an image of other person different from the user and the party to be evaluated and an other person evaluating step for evaluating a relationship between the other person and the party to be evaluated on the basis of the second image data stored by the storing step and the third image data stored by the third image data storing step, and the evaluation result displaying step moves and displays the image obtained through the subsequent imaging by the imaging step on the basis of the evaluation result by the evaluating step, and moves and displays the image of the other person different from the user and the party to be evaluated on the basis of the evaluation result by the other person evaluating step.

In the fourteenth embodiment, an information processing program causes a computer to further execute a third image data storing step and an other person evaluating step. The computer previously stores third image data indicating an image of other person different from the user and the party to be evaluated in the third image data storing step. In the other person evaluating step, a relationship between the other person and the party to be evaluated is evaluated on the basis of the second image data stored by the storing step and the third image data stored by the third image data storing step, and in the evaluation result displaying step, the image obtained through the subsequent imaging by the imaging step is moved and displayed on the basis of the evaluation result by the evaluating step, and the image of the other person different from the user and the party to be evaluated is moved and displayed on the basis of the evaluation result by the other person evaluating step.

According to the fourteenth embodiment, the other persons, that is, the images of the persons except for the user and the party to be evaluated are simultaneously displayed, capable of easily informing the user of the relative evaluation result inclusive of other persons.

A fifteenth embodiment is an information processing program, and the information processing program causes the computer to further execute a dividing step for dividing a plurality of third image data into a plurality of groups and a selecting step for selecting at least one group out of the plurality of groups, and the evaluation result displaying step moves and displays the image obtained through subsequent imaging by the imaging step on the basis of the evaluation result by the evaluating step, and displaying in a recognizable manner an image corresponding to the third image data belonging to the group selected by the selecting step out of images of other persons different from the user and the party to be evaluated on the basis of the evaluation result by the other person evaluating step.

In the fifteenth embodiment, an information processing program causes a computer to further execute a dividing step and a selecting step. The computer divides a plurality of third image data into a plurality of groups in the dividing step, and selects at least one group out of the plurality of groups in the selecting step. In the evaluation result displaying step, the image obtained through subsequent imaging by the imaging step is moved and displayed on the basis of the evaluation result by the evaluating step, and an image corresponding to the third image data belonging to the group selected by the selecting step out of images of other persons different from the user and the party to be evaluated is displayed in a recognizable manner on the basis of the evaluation result by the other person evaluating step.

According to the fifteenth embodiment, the face images as to only the selected group are displayed, capable of displaying only the evaluation result in a desired group.

A sixteenth embodiment is an information processing apparatus, and the information processing apparatus comprises an imaging means for subsequently imaging a user, an evaluating means for making an evaluation of first image data indicating the image obtained through the subsequent imaging by the imaging means, and an evaluation result displaying means for displaying an evaluation result by the evaluating means through subsequent updating.

In the sixteenth embodiment as well, similar to the first embodiment, it is possible to inform the user of the evaluation result by utilizing the image data obtained by imaging the user in different expressions and angles without the need of a complex operation.

A seventeenth embodiment is a method of making an evaluation based on an image by utilizing an information processing apparatus and informing a user of an evaluation result, the method comprises: an imaging step for subsequently imaging a user with a camera, an evaluating step for making an evaluation of first image data obtained by the subsequent imaging by the imaging step, and an evaluation result displaying step for displaying an evaluation result by the evaluating step through subsequent updating.

In the seventeenth embodiment as well, similar to the first embodiment, it is possible to inform the user of the evaluation result by utilizing the image data obtained by imaging the user in different expressions and angles without the need of a complex operation.

According to the present technology, it is possible to implement a display controlling program and a display controlling apparatus capable of informing the user of the evaluation result as to the images in various manners without the need of a complex operation.

The above described features, aspects and advantages of the present technology will become more apparent from the following detailed description of the present technology when taken in conjunction with the accompanying drawings.

BRIEF DESCRIPTION OF THE DRAWINGS

FIG. 3(A) shows one side surface in a close state, FIG. 3(B) shows a top surface in the close state, FIG. 3(C) shows the other side surface in the close state, and FIG. 3(D) shows a bottom surface in the close state;

FIG. 6 is an illustrative view showing one example of a change of a main game screen, FIG. 6(A) shows a screen when a certain group is selected, and FIG. 6(B) shows a screen when another group is selected;

FIG. 7 is an illustrative view showing one example of a change of a game screen for performing a compatibility determination, FIG. 7(A) shows a screen when a face of a camera image turns to a front, and FIG. 7(B) shows a screen when the face of the camera image turns to a side;

FIG. 10 is an illustrative view showing one example of a memory map, FIG. 10(A) shows a part of a content of the main memory, and FIG. 10 (B) shows a part of a content of a preset data memory;

DETAILED DESCRIPTION OF THE PREFERRED EMBODIMENTS

Figure 1:
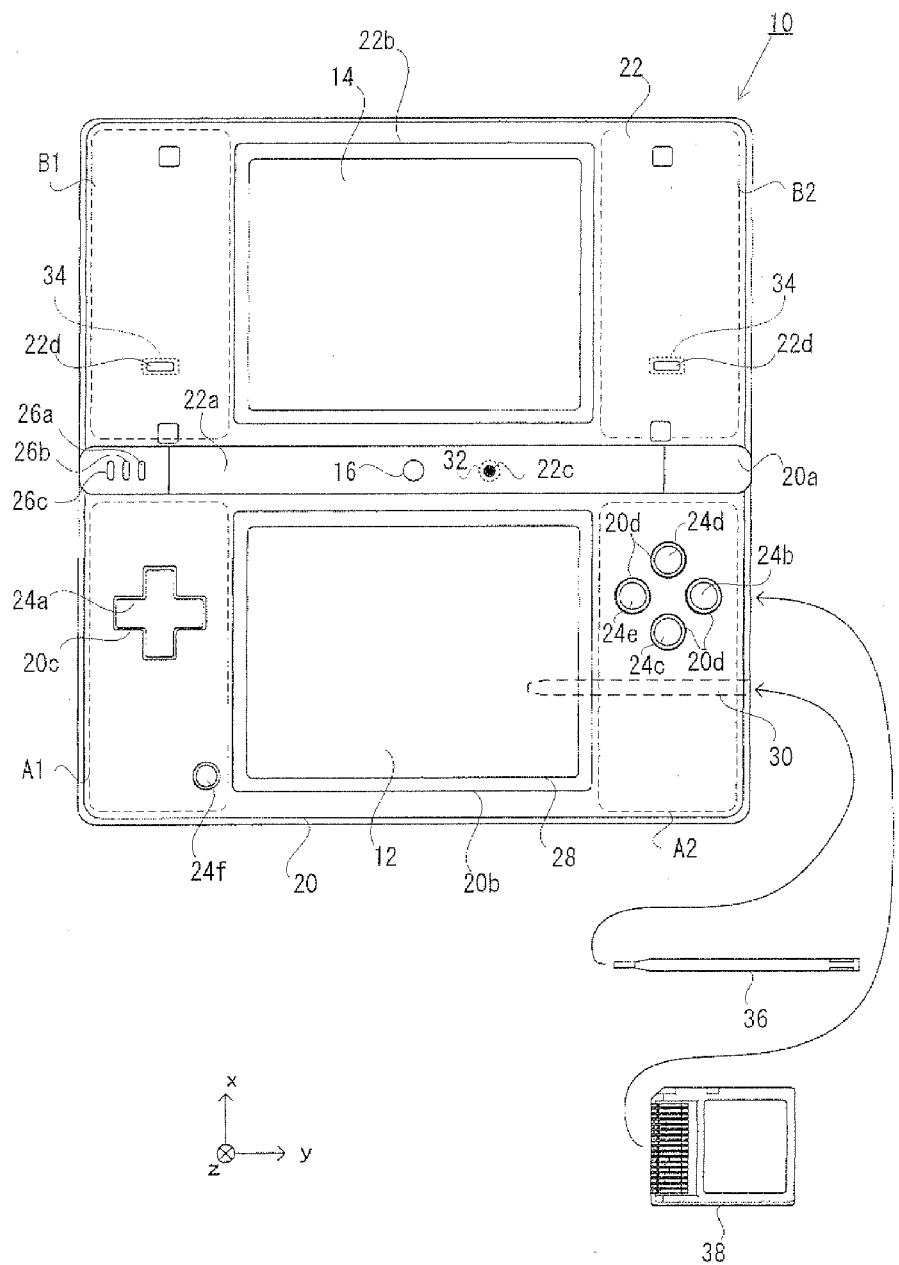
FIG. 1 is an external view of a game apparatus of one embodiment to show one side thereof in an open state.
Figure 2:
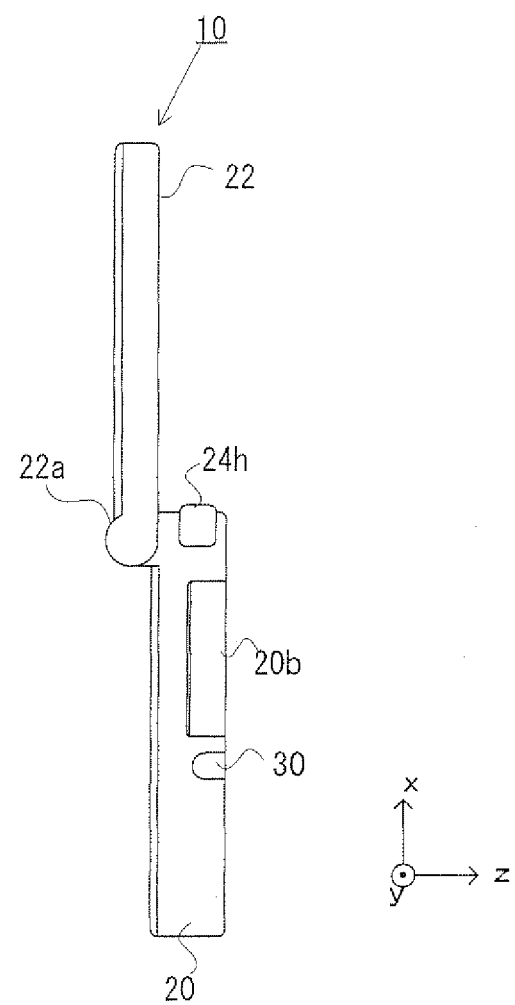
FIG. 2 is an external view of the game apparatus to show a side surface thereof in the open state.
Figure 3:
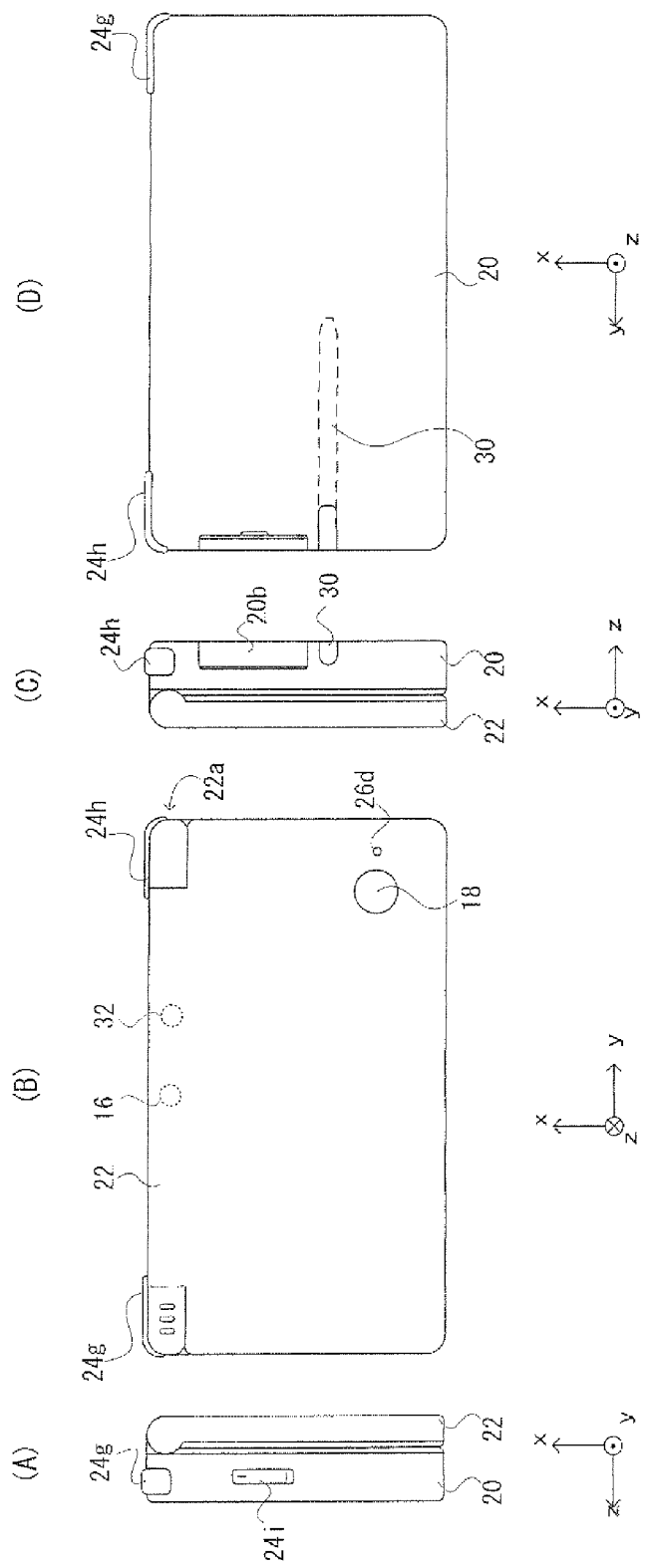
FIG. 3 is an external view of the game apparatus.

In FIG. 1-Figure 3, an external view of the game apparatus 10 of one embodiment is shown. The game apparatus 10 is a foldable game apparatus, and each of FIG. 1 and FIG. 2 shows the game apparatus 10 in a opened state (open state), and FIG. 3 shows the game apparatus 10 in a closed state (close state). Furthermore, FIG. 1 is a front view of the game apparatus 10 in the open state, and FIG. 2 is a side view of the game apparatus in the open state. The game apparatus 10 has two displays (LCDs 12 and 14) and two cameras (cameras 16 and 18), can image an image with the cameras, display the imaged image on a screen and store the data of the imaged image.

The game apparatus 10 is constructed small enough to be held by the user with both hands or one hand of a user even in the open state.

The game apparatus 10 has two housings of a lower housing 20 and an upper housing 22. The lower housing 20 and the upper housing 22 are connected with each other so as to be opened or closed (foldable). In this embodiment, the respective housings 20 and 22 are formed in the form of plate of a horizontally long rectangular, and are rotatably connected with each other at the long sides of both of the housings.

The upper housing 22 is pivotally supported at a part of the upper side of the lower housing 20. This makes the game apparatus 10 to take the close state (the angle formed by the lower housing 20 and the upper housing 22 is about 0° (see FIG. 3)) and the open state (the angle formed by the lower housing 20 and the upper housing 22 is about 180° (see FIG. 2)). The user generally uses the game apparatus 10 in the open state, and keeps the game apparatus 10 in the close state when not using the game apparatus 10. Furthermore, the game apparatus 10 can maintain the angle formed by the lower housing 20 and the upper housing 22 at an arbitrary angle between the close state and the open state by friction, etc. exerted on the hinge as well as the close state and the open state as described above. That is, the upper housing 12 can be fixed with respect to the lower housing 14 at an arbitrary angle.

The configuration of the lower housing 20 is first explained. As shown in FIG. 1, the game apparatus 10 has the lower LCD (liquid crystal display) 12. The lower LCD 12 takes a horizontally-long shape, and is arranged such that the direction of the long side is coincident with the long side of the lower housing 20. The lower LCD 12 is provided on an inner surface of the lower housing 20. Accordingly, if the game apparatus 10 is not to be used, the game apparatus 10 is in the close state to thereby prevent the screen of the lower LCD 12 from being soiled, damaged, and so forth. Additionally, in this embodiment, an LCD is used as a display, but other arbitrary displays, such as a display utilizing EL (Electro Luminescence), for example, may be used. Furthermore, the game apparatus 10 can employ a display of an arbitrary resolution. Additionally, in a case that the game apparatus 10 is used as an imaging device, the lower LCD 12 is used for displaying, in real time, images (through image) imaged by the camera 16 or 18.

The inner surface of the lower housing 20 is formed to be approximately planar. At the center of the inner surface, an opening 20b for exposing the lower LCD 12 is formed. At the left of the opening 20b (in the negative direction of the y axis in the drawing), an opening 20c is formed, and at the right of the opening 20b, an opening 20d is formed. The openings 20b and 20c are for exposing the respective keytops (the top surfaces of the respective buttons 24a-24e). Then, the screen of the lower LCD 12 provided inside the lower housing 20 is exposed from the opening 20b, and the respective keytops are exposed from the openings 20c and 20d. Thus, on the inner surface of the lower housing 20, on both sides of the opening 20b for the lower LCD 12 set at the center, non-screen areas (dotted line areas A1 and A2 shown in FIG. 1. More specifically, areas for arranging the respective buttons 24a-24e; button arranging area) are provided.

On the lower housing 20, the respective buttons 24a-24i and a touch panel 28 are provided as an input device. As shown in FIG. 1, the direction input button 24a, the button 24b, the button 24c, the button 24d, the button 24e, and the power button 24f out of the respective buttons 24a-24i are provided on the inner surface of the lower housing 20. The direction input button 24a is utilized for a selecting operation, for example, and the respective buttons 24b-24e are utilized for a decision operation and a cancel operation, for example. The power button 24f is utilized for turning on/off the power of the game apparatus 10. Here, the direction input button 24a and the power button 24f are provided on one side (left side in FIG. 1) of the lower LCD 12 provided at substantially the center of the lower housing 20, and the buttons 24b-24e are provided at the other side (right side in FIG. 1) of the lower LCD 12. The direction input button 24a and the buttons 24b-24e are utilized for performing various operations to the game apparatus 10.

FIG. 3(A) is a left side view of the game apparatus 10 in the close state, FIG. 3(B) is a front view of the game apparatus 10, FIG. 3(C) is a right side view of the game apparatus 10, and FIG. 3(D) is a rear view of the game apparatus 10. As shown in FIG. 3(C) and FIG. 3(A), the volume button 24i is provided on the left side surface of the lower housing 20. The volume button 24i is utilized for adjusting a volume of a speaker 34 furnished in the game apparatus 10. Furthermore, as shown in FIG. 3(D), the button 24h is provided at the right corner of the upper side surface of the lower housing 20. The button 24g is provided at the left corner of the upper side surface of the lower housing 20. The both of the buttons 24g and 24h are utilized for performing a imaging instructing operation (shutter operation) on the game apparatus 10, for example. Alternatively, both of the buttons 24g and 24h may be made to work as shutter buttons. In this case, a right-handed user can use the button 24h, and a left-handed user can use the button 24g, capable of improving usability for both of the users. Additionally, the game apparatus 10 can constantly make both of the buttons 24g and 24h valid as shutter buttons, or the game apparatus 10 is set to be a right-handed use or a left-handed use (the setting is input by the user according to a menu program, etc. and the set data is stored), and when the right-handed use is set, only the button 24h is made valid, and when the left-handed use is set, only the button 24g may be made valid.

As shown in FIG. 1, the game apparatus 10 is further provided with the touch panel 28 as an input device other than the respective operation buttons 24a-24i. The touch panel 28 is set to the screen of the lower LCD 12. In this embodiment, the touch panel 28 is a touch panel of a resistance film system. Here, the touch panel can employ arbitrary push type touch panels over the resistance film system. In this embodiment, as the touch panel 28, a touch panel having the same resolution (detection accuracy) as that of the lower LCD 12 is utilized. The resolution of the touch panel 28 and the resolution of the lower LCD 12 are not necessarily coincident with each other. Furthermore, at the right side surface of the lower housing 20, an inserting portion 30 (shown by a dotted line in FIG. 1 and FIG. 3(D)) is provided. The inserting portion 30 can house a touch pen 36 utilized for performing an operation on the touch panel 28. It should be noted that an input to the touch panel 28 is generally performed by means of the touch pen 36, but can be performed on the touch panel 28 with fingers of the user besides the touch pen 36.

In addition, on the right side surface of the lower housing 20, an openable and closeable cover portion is provided. Inside the cover portion, a connector (not illustrated) for electrically connecting the game apparatus 10 and the memory card 38 is provided. The memory card 38 is detachably attached to a connector. The memory card 38 is used for storing (saving) image data imaged by the game apparatus 10, for example.

As shown in FIG. 1, at the left of the shaft portion 20a of the lower housing 20, three LEDs 26a-26c are attached. Here, the game apparatus 10 can perform a wireless communication with another appliance, and the first LED 26a lights up when a wireless communication with the appliance is established. The second LED 26b lights up while the game apparatus 10 is recharged. The third LED 26c lights up when the main power supply of the game apparatus 10 is turned on. Accordingly, by the three LEDs 26a-26c, it is possible to inform the user of a communication-established state, a charge state, and a main power supply on/off state of the game apparatus 10.

Figure 5:
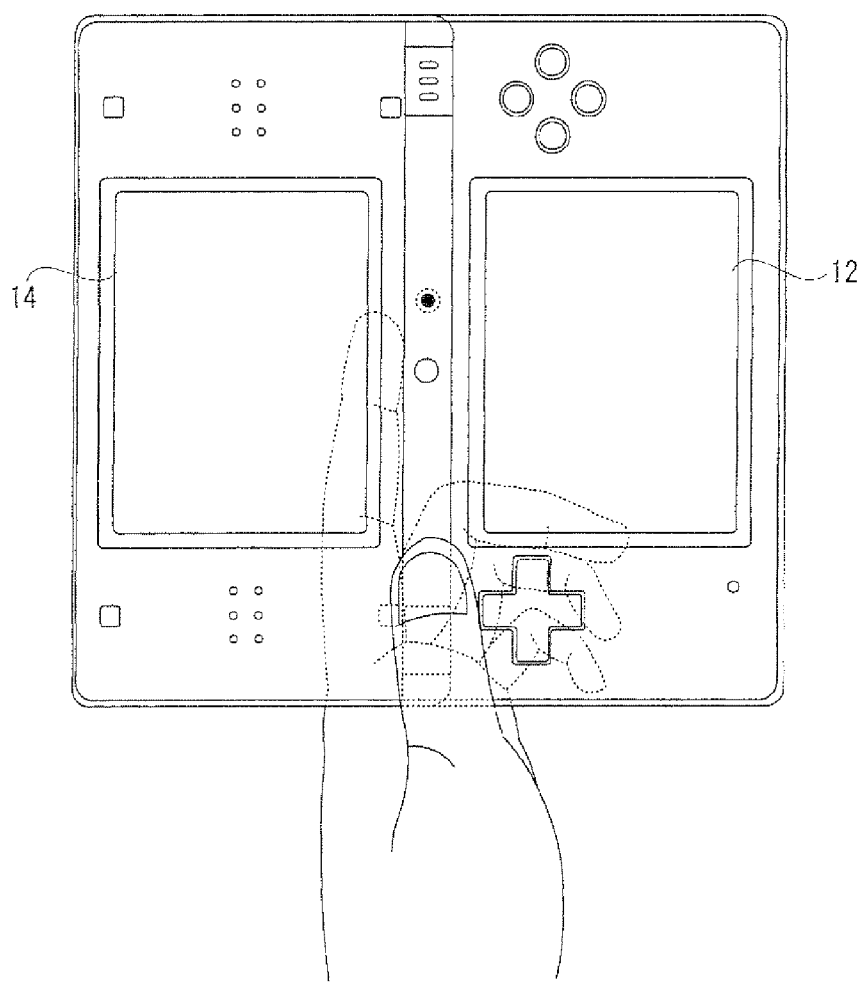
FIG. 5 is an illustrative view showing a state that the game apparatus is held by the user.

As described above, the lower housing 20 is provided with the input device (touch panel 28 and respective buttons 24a-24i) for performing an operation input to the game apparatus 10. Accordingly, when utilizing the game apparatus 10, the user performs an operation on the game apparatus 10, generally holding the lower housing 20 with both hands with the LCDs 12 and 14 vertically arranged as shown in FIG. 1 (this holding method is called "horizontal held"). Furthermore, in a case of playing some kinds of games, a "smiling note game" described later, for example, the imaging device 10 is held in a vertically held state (state rotate by 90 degrees to the left from the horizontally-held state) as shown in FIG. 5. In this state, the user can hold the imaging device 10 while bringing about the engagement between the thumb and the protrusion (shaft portion 11A and 21A), and bringing about the engagement between the index finger and the upper side surface of the lower housing 11. Thus, with the dominant hand not holding the imaging device 10, it is easily perform a button operation and a touch operation for the game. Here, in a case of a left-handed user, he or she can play the game holding the game apparatus 10 rotated by 90 degrees to the right from the horizontal-held state.

On the one hand, the upper housing 22 has a configuration for imaging an image (camera), and a configuration for displaying the imaged image (display). The configuration of the upper housing 22 is explained below.

As shown in FIG. 1, the game apparatus 10 has the upper LCD 14. The upper LCD 14 is set to the upper housing 22. The upper LCD 14 takes a horizontally-long shape, and is arranged such that the direction of the long side is coincident with the long side of the upper housing 22. The upper LCD 14 is provided on the inner surface of the upper housing 2 (the inner surface when the game apparatus 10 is in the close state). Accordingly, if the game apparatus 10 is not to be used, the game apparatus 10 is set to the close state to thereby prevent the screen of the upper LCD 14 from being soiled, damaged, and so forth. Here, similar to the lower LCD 12, in place of the upper LCD 14, a display with an arbitrary form and an arbitrary resolution may be utilized. It should be noted that in another embodiment, a touch panel may be provided on the upper LCD 14 as well.

Furthermore, the game apparatus 10 has the two cameras 16 and 18. The respective cameras 16 and 18 are housed in the upper housing 22. As shown in FIG. 1, the inward camera 16 is attached to the inner surface of the upper housing 22. On the other hand, as shown in FIG. 3(B), the outward camera 18 is attached to the surface being opposed to the surface to which the inward camera 16 is provided, that is, the outer surface of the upper housing 22 (outer surface when the game apparatus 10 is in the close state). Thus, the inward camera 16 can image a direction to which the inner surface of the upper housing 22 is turned, and the outward camera 18 can image a direction opposite to the imaging direction of the inward camera 16, that is, a direction to which the outer surface of the upper housing 22 is turned. As described above, in this embodiment, the two cameras 16 and 18 are provided so as to make the imaging directions opposite to each other. Accordingly, the user can image the two different directions without shifting the game apparatus 10 inside out. For example, the user can image a landscape as the user is seen from the game apparatus 10 with the inward camera 16, and can image a landscape as the direction opposite to the user is seen from the game apparatus 10 with the outward camera 18.

Furthermore, the inward camera 16 is attached to the center of the shaft portion 22a formed at the bottom of the upper housing 22. That is, the inward camera 16 is attached at the center part where the two housings 20 and 22 are connected. Accordingly, in a case that the game apparatus 10 is in the open state, the inward camera 16 is arranged between the two LCDs 12 and 14 (see FIG. 1). In other words, the inward camera 16 is positioned in the vicinity of the center of the game apparatus 10. Here, "the center of the game apparatus 10" means the center of the operation surface of the game apparatus 10 (surface being made up of the inner surfaces of the respective housings 20 and 22 in the open state). Here, it may be said that the inward camera 16 is arranged in the vicinity of the center in the horizontal direction of the LCDs 12 and 14.

In this embodiment, when the game apparatus 10 is set to the open state, the inward camera 16 is arranged in the vicinity of the center of the game apparatus 10, and therefore, in a case that the user images the user himself or herself by the inward camera 16, the user may hold the game apparatus 10 at a position directly opposite to the game apparatus 10. That is, if the user holds the game apparatus at a normal holding position, the user is positioned at approximately the center of an imaging range, and the user himself or herself can easily be within the imaging range.

Furthermore, as shown in FIG. 3(B), the outward camera 18 is arranged at the upper end of the upper housing 22 (portion far away from the lower housing 20) in a case that the game apparatus 10 is set to the close state. Here, since the outward camera 18 is not for imaging the user holding the game apparatus 10, there is less need for being provided at the center of the game apparatus 10.

Additionally, as shown in FIG. 1 or FIG. 3(B), a microphone 32 is housed in the upper housing 22. More specifically, the microphone 32 is attached to the shaft portion 22a of the upper housing 22. In this embodiment, the microphone 32 is attached around the inward camera 16 (next to the inward camera 16 along the y axis), and specifically attached next to the inward camera 16 in the positive direction of the y axis. Furthermore, a through hole for microphone 22c is mounted to the shaft portion 22a at a position corresponding to the microphone 32 (next to the inward camera 16) such that the microphone 32 can detect a sound outside the game apparatus 10. Alternatively, the microphone 32 may be housed in the lower housing 20. For example, the through hole for microphone 22c is provided on the inner surface of the lower housing 20, specifically, at the lower left (button arranging area A1) of the inner surface of the lower housing 20, and the microphone 32 may be arranged in the vicinity of the through hole for microphone 22c within the lower housing 20.

As shown in FIG. 3(B), on the outer surface of the upper housing 22, a fourth LED 26d is attached. The fourth LED 26d is attached around the outward camera 18 (at the right side of the outward camera 18 in this embodiment or above the outward camera 18 in example in FIG. 17 (b) in the opened state.) The fourth LED 26d lights up at a time when an imaging is made with the inward camera 16 or the outward camera 18 (shutter button is pressed). Furthermore, the fourth LED 38 continues to light up while a motion image is imaged by the inward camera 16 or the outward camera 18. By making the fourth LED 26*d* light up, it is possible to inform an object to be imaged that an imaging with the game apparatus 10 is made (is being made).

In addition, the inner surface of the lower housing 22 is formed to be approximately planar. As shown in FIG. 1, at the center of the inner surface, an opening 22*b* for exposing the upper LCD 14 is formed. The screen of the upper LCD 14 housed inside the upper housing 22 is exposed from the opening 22*b*. Furthermore, on both side of the aforementioned opening 22*b*, a sound release hole 22*d* is formed one by one. Inside the sound release hole 22*d* of the upper housing 22, a speaker 34 is housed. The sound release hole 22*d* is a through hole for releasing a sound from the speaker 34.

Thus, on the inner surface of the upper housing 22, non-display areas (areas B1 and B2 represented by a dotted lines in FIG. 1. More specifically, areas for arranging the speaker 34; speaker arranging areas) are provided on both sides of the opening 22*b* set at the center of the upper LCD 14. The two sound release holes 22*d* are arranged at approximately the center of the horizontal direction of each speaker arranging area with respect to the horizontal direction, and at the lower portion of each speaker arranging area with respect to the vertical direction (area close to the lower housing 20).

As described above, the upper housing 22 is provided with the cameras 16 and 18 which are configured to image an image and the upper LCD 14 as a display means for mainly displaying the imaged image. On the other hand, the lower housing 20 is provided with the input device (touch panel 28 and respective buttons 24*a*-24*i*) for performing an operation input to the game apparatus 10. Accordingly, when utilizing the game apparatus 10 as an imaging device, the user can perform an input to the input device with the lower housing 20 holding while viewing the imaged image (image imaged by the camera) displayed on the upper LCD 14.

Furthermore, in the vicinity of the camera 16 of the upper housing 22, the microphone 32 configured to input a sound is provided, and the game apparatus 10 can also be used as a recording device.

Figure 4:
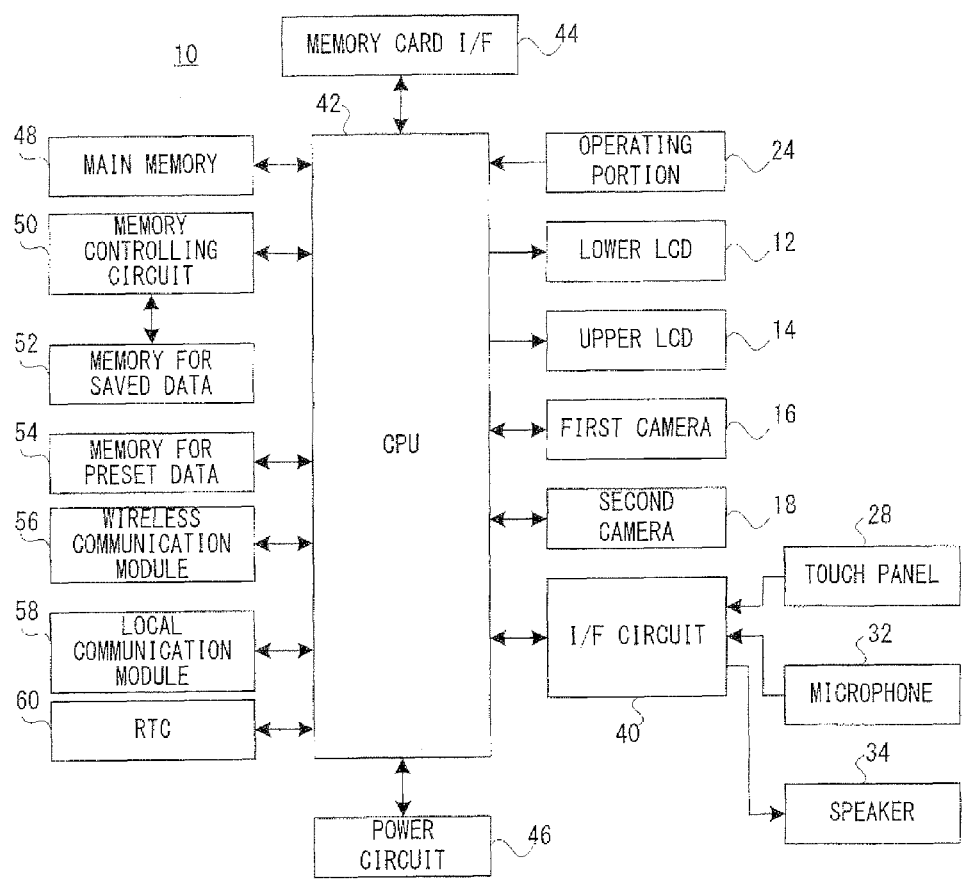
FIG. 4 is a block diagram showing one example of an electric configuration of the game apparatus.

FIG. 4 is a block diagram showing an internal configuration of the game apparatus 10. As shown in FIG. 4, the game apparatus 10 includes electronic components, such as a CPU 42, a main memory 48, a memory controlling circuit 50, a memory for saved data 52, a memory for preset data 54, a memory card interface (memory card I/F) 44, a wireless communication module 56, a local communication module 58, a real-time clock (RTC) 39, a power supply circuit 46, and an interface circuit (I/F circuit) 40, etc. Theses electronic components are mounted on an electronic circuit board, and housed in the lower housing 20 (or the upper housing 22 may also be appropriate).

The CPU 42 is an information processing means to execute various programs. In a case that the game apparatus 10 is utilized as an imaging device, the program for it is stored in the memory (memory for saved data 52, for example) within the game apparatus 10. The CPU 42 executes the program to allow the game apparatus 10 to function as an imaging device. Here, the programs to be executed by the CPU 42 may previously be stored in the memory within the game apparatus 10, may be acquired from the memory card 38, and may be acquired from another appliance by communicating with this another appliance.

The CPU 42 is connected with the main memory 48, the memory controlling circuit 50, and the memory for preset data 54. Furthermore, the memory controlling circuit 50 is connected with the memory for saved data 52. The main memory 48 is a memory means to be utilized as a work area and a buffer area of the CPU 42. That is, the main memory 48 stores various data to be utilized in the game processing and the imaging processing, and stores a program obtained from the outside (memory cards 38, another appliance, etc.). In this embodiment, a PSRAM (Pseudo-SRAM) is used, for example, as a main memory 48. The memory for saved data 52 is a memory means for storing a program to be executed by the CPU 42, data of an image imaged by the respective cameras 16 and 18, etc. The memory for saved data 52 is configured by a NAND type flash memory, for example. The memory controlling circuit 50 is a circuit for controlling reading and writing from and to the memory for saved data 52 according to an instruction from the CPU 42. The memory for preset data 54 is a memory means for storing data (preset data), such as various parameters, etc. which are previously set in the game apparatus 10. As a memory for preset data 54, a flash memory to be connected to the CPU 42 through an SPI (Serial Peripheral Interface) bus can be used.

The memory card I/F 44 is connected to the CPU 42. The memory card I/F 44 performs reading and writing data from and to the memory card 38 attached to the connector according to an instruction from the CPU 42. In this embodiment, the image data imaged by the respective cameras 16 and 18 is written to the memory card 38, and the image data stored in the memory card 38 is read from the memory card 38 and stored in the memory for saved data 52.

The wireless communication module 56 has a function of connecting to a wireless LAN according to an IEEE802.11.b/g standard-based system, for example. Furthermore, the local communication module 58 has a function of performing a wireless communication with the same types of the game apparatuses by a predetermined communication system. The wireless communication module 56 and local communication module 58 are connected to the CPU 42. The CPU 42 can send and receive data over the Internet with other appliances by means of the wireless communication module 56, and can send and receive data with the same types of other game apparatuses by means of the local communication module 58.

Additionally, the CPU 42 is connected with the RTC 60 and the power supply circuit 46. The RTC 60 counts a time to output the same to the CPU 42. The CPU 42 can calculate a current time (date) on the basis of the time counted by the RTC 60, and detects an operation timing as to when an image is to be acquired, etc. The power supply circuit 46 controls power supplied from the power supply (a battery accommodated in the lower housing) included in the game apparatus 10, and supplies the power to the respective circuit components within the game apparatus 10.

Moreover, the game apparatus 10 is provided with the microphone 32 and the speaker 34. The microphone 32 and the speaker 34 are connected to the I/F circuit 40. The microphone 32 detects a sound of the user and outputs a sound signal to the I/F circuit 40. The speaker 34 outputs a sound corresponding to the sound signal from the I/F circuit 40. The I/F circuit 40 is connected to the CPU 42. Furthermore, the touch panel 28 is connected to the I/F circuit 40. The I/F circuit 40 includes a sound controlling circuit for controlling the microphone 32 and the speaker 34, and a touch panel controlling circuit for controlling the touch panel 28. The sound controlling circuit performs an A/D conversion and a D/A conversion on a sound signal, or converts a sound signal into audio data in a predetermined format. The converted audio data is written to a sound area 80 (see FIG. 10) of the main memory 48. If the game apparatus 10 is utilized as a recording device, the audio data stored in the sound area 80 is written to the memory for saved data 52 via the memory controlling circuit 50 thereafter (recorded in the memory card 38 via the memory card I/F 44 as required). The touch panel controlling circuit generates touch position data in a predetermined format on the basis of a signal from the touch panel 28 and outputs the same to the CPU 42. The touch position data indicates coordinates of a position where an input is performed on an input surface of the touch panel 28. Also, the touch panel controlling circuit performs reading of a signal from the touch panel 28 and generation of the touch position data per each predetermined time. The CPU 42 can know the position where an input is made on the touch panel 22 by acquiring the touch position data.

The operating portion 24 is made up of the aforementioned respective buttons 24a-24i, and connected to the CPU 42. The operation data indicating a input state (whether or not to be pressed) with respect to each of the operation buttons 24a-24k is output from the operation button 24 to the CPU 42. The CPU 42 executes processing according to an input to the operating portion 24 by acquiring the operation data from the operating portion 24.

The respective cameras 16 and 18 are connected to the CPU 42. The respective cameras 16 and 18 image images according to an instruction from the CPU 42, and output image data corresponding to the imaged images to the CPU 42. The CPU 42 writes the image data from each of the cameras 16 and 18 to an image area 78 (see FIG. 7) of the main memory 48. In a case that the game apparatus 10 is utilized as an imaging device, the image data stored in the image area 78 i written to the memory for saved data 52 via the memory controlling circuit 50 (and moreover recorded in the memory card 38 via the memory card I/F 44 as required). Furthermore, although the detail is described later, the image data sorted in the image area 78 can also be utilized for various game processing.

In addition, each of the LCDs 12 and 14 is connected to the CPU 42. Each of the LCDs 12 and 14 displays an image according to an instruction by the CPU 42. In a case that the game apparatus 10 is utilized as an imaging device, the CPU 42 displays an image acquired from any one of the cameras 16 and 18 on the upper LCD 14, and displays an operation screen generated according to predetermined processing on the lower LCD 12. If a game is played by the game apparatus 10, a game image is displayed on one or both of the LCD 12 and 14.

Figure 8:
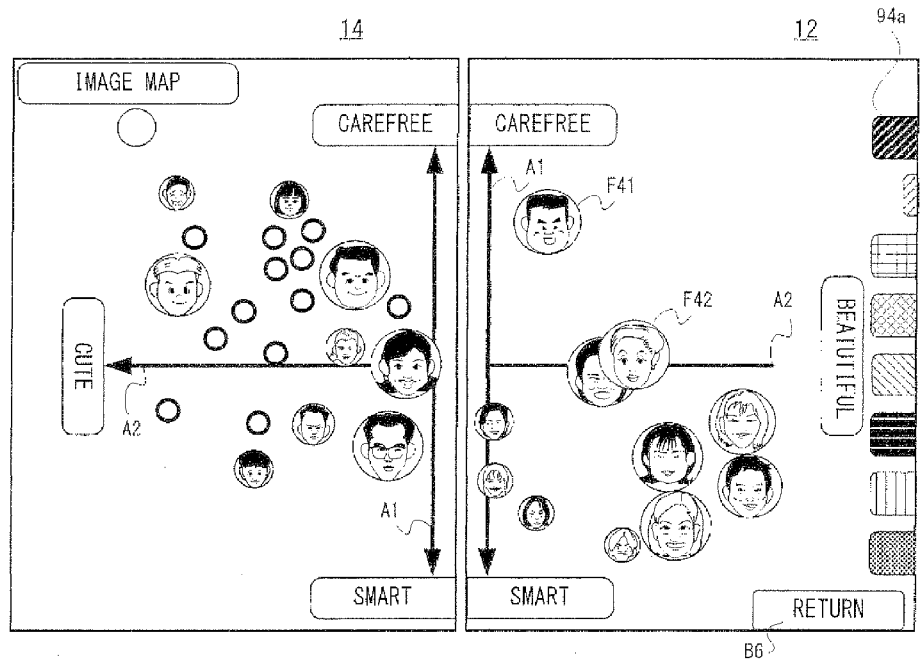
FIG. 8 is an illustrative view showing one example of a game screen to perform a image map determination.
Figure 9:
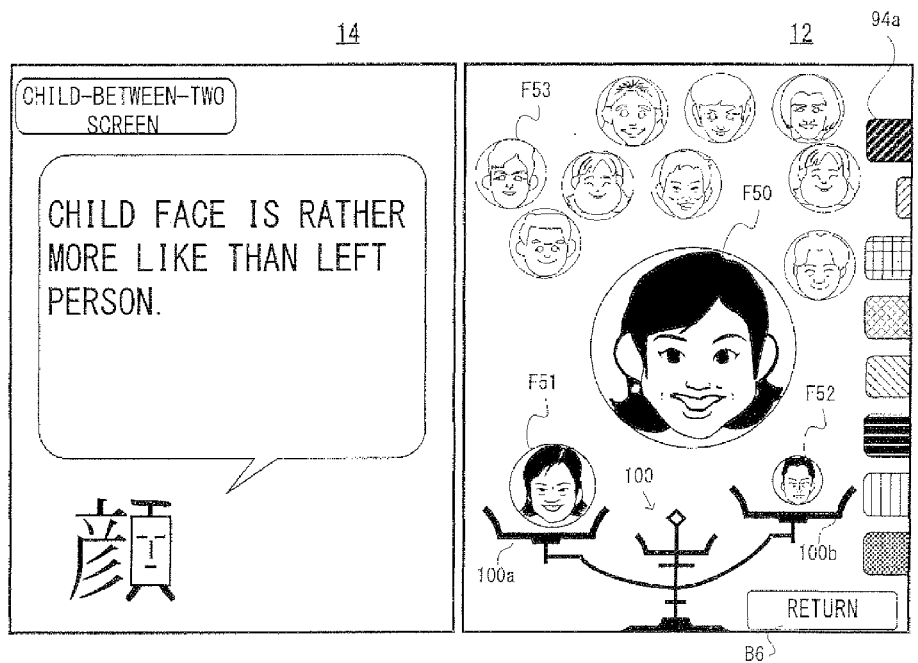
FIG. 9 is an illustrative view showing one example of a game screen to perform a face-of-child-between-two determination.

When a "smiling note game" is played by utilizing the game apparatus 10 configured as described, the game apparatus 10 is vertically held as shown in FIG. 5, and game images shown in FIG. 6-FIG. 9 are displayed on the LCDs 12 and 14. FIG. 6 is a main game screen at the beginning of the game, FIG. 7-FIG. 9 shows various determination screens when various determination buttons are pressed on the main game screen. Among FIG. 6-FIG. 9, the game image is split in two screens side by side, and an image on the left screen is displayed on the LCD 14, and an image on the right screen is displayed on the LCD 12. Here, the display screen on the LCD 12 is called "right screen 12", and the display screen on the LCD 14 is called "left screen 14" hereunder.

Here, the "smiling note game" is a game in which while a facial image of the user is imaged with the inward camera 16 (hereinafter referred simply as "camera 16") in real time (through imaging), various determinations and evaluations, such as "today's compatibility" (see FIG. 7), "image map" (see FIG. 8) and "face-of-child-between two" (see FIG. 9) are performed by utilizing the facial image of the user in a manner of the through image (moving image for through display) (hereinafter referred to as "camera image") and a facial image of the user recorded in a manner of a still image imaged in the past (hereinafter referred to as "face image"). Here, in another embodiment, the facial image of the user may be imaged by the outward camera 18 in place of or in addition to the inward camera 16.

The registered face images are divided into a plurality of groups, eight groups, here, and one group arbitrarily selected from these eights groups by the user is an object for various determination processing. FIG. 6(A) shows a situation in which one group from the eights groups is selected on the main game screen, and FIG. 6(B) shows a situation in which another group is selected. Among FIG. 6(A) and FIG. 6(B), the left screen 14 includes a storing region 90 for storing images, and the right screen 12 includes an active box 92A functioning as an operating region to operate images.

In the storing region 90, seven boxes (seven out of eight boxes 90a-90h) corresponding to seven groups out of the eights groups except for the currently selected one are displayed, and 10 face images is stored at a maximum in each of the boxes 90a, 90b, . . . . The right screen 12 further includes a tub area 92B defined at a position different from the active box 92A, and in the tub area 92B, seven tubs (seven out of eight tubs 94a-94h) respectively corresponding to the seven boxes on the left screen and one hidden tub (one out of eight tubs 94a-94h) corresponding to one group which is being currently selected are displayed. In the active box 92A, the above-described camera image F0 and face images (F1-F10, for example) belonging to one group which is being currently selected are stored.

On the game screen in FIG. 6(A), the camera image F0 is placed approximately the center of the active box 92A, and the face images F1-F10 are placed surrounding the camera image F0. The camera image F0 is displayed larger in size than the face images F1-F10 within the active box 92A. The size of the face images F1-F10 within the active box is larger than that of the face images within the boxes 90a, 90c-90h on the left screen (hereinafter referred to as "large size" as to the size of the camera image F0, "medium size" as to the size of the face images F1, F2, . . . within the active box 92A, and "small size" as to the face images within each boxes 90a, 90b). Also, on the right screen 12, a camera button. B0 for recording (registering) the camera image F0 as one new face image and various determination buttons B1-B5 (described later) for activating various determination processing are further displayed.

When the tub 94a is short-pressed on the game screen in FIG. 6(A), the game screen is updated by the game screen in FIG. 6(B). More specifically, the box 90b corresponding to the hidden tub 94b appears on the left screen 14, and the ten face images F1-F10 developed within the active box 92A move into the box 90b. In stead, ten face images F11-F20 stored within the box 90a move into the active box 92A, and the box 90a disappears from the screen. Furthermore, the tub 94a is turned to a hidden tub while the hidden tub 94b is returned to a normal tub. Thus, the game screen changes from the situation in FIG. 6(A) to the situation in FIG. 6(B).

Next, when the camera button B0 is pressed on the main game screen in FIG. 6(A) or FIG. 6(B), a still image at or the vicinity of the frame when the camera button B0 is pressed out of a plurality frame of still images making up of the camera image F0 as a moving image is recorded as a one new face image. Here, in another embodiment, when the camera button B0 is pressed, the main game screen shifts to an imaging screen (not illustrated), and when the "OK (to start imaging)" button is pressed on the imaging screen, imaging processing may be executed.

Furthermore, on the main game screen as shown in FIG. 6(A) or FIG. 6(B), the camera image F0 or any one of face images can be selected by short-pressing it, and a cursor (bold frame FR circling the image here) is displayed at a position of the image which is being selected. On the game screen in FIG. 6(A), the face image F10 is selected while on the game screen in FIG. 6(B), the camera image F0 is selected. When the today's compatibility determining button B1 is pressed in a state that the camera image F0 is selected, the main game screen is updated to a compatibility determining screen shown in FIG. 7(A). On the compatibility determining screen, concentric circles C1, C2, . . . are drawn centered at a predetermined position toward right, and the camera image F0 which is being selected on the main game screen is displayed at a center point C0 of the concentric circles C1, C2, . . . in large size.

On the compatibility determining screen, the face images F31, F32, . . . developed within the active box 92A on the main game screen and the face images stored in the respective boxes 90a, 90b, . . . are respectively displayed in medium size and small size in such positions as to be far from the camera image F0 (center point C0) by a distance corresponding to the compatibility with the camera image (only part of the face images in small size are displayed, here). Accordingly, the compatibility with the image at the center point C0 (camera image F0, here) is the most with respect to the face image F31 nearest the center point C0, and becomes less with respect to an image far from the center point C0.

Then, on the compatibility determining screen, the image of the center point C0, that is, the camera image F0 is different in compatibility with each of the face images F31, F32, . . . depending on the orientation and the expression of the face, to change the position of each of the face images F31, F32, . . . in real time. For example, when the face of the camera image F0 turning to the front on the game screen shown in FIG. 7(A) is turned sideway, the game screen is updated as shown in FIG. 7(B). On the game screen shown in FIG. 7(B), the face image F31 nearest the center point C0 is back away, and the second nearest face image F32 advances to a position nearest the center point C0. Each of the other face images also advances or is back away.

It should be noted that on the compatibility determining screen, a tub 94a, and the like are displayed at the right end similar to those in FIG. 6, and a desired tub is pressed to display the face images in another group in a enlarged manner in stead of each of the face images F31, F32, . . . which is being displayed being displayed in a reduced manner, and. In addition, a "return" button B6 is displayed, and when this is pressed, the process returns to the main game screen. This holds true for another determination screen (FIG. 8, FIG. 9, FIG. 29 and FIG. 30).

On the other hand, when the today's compatibility determining button. B1 is pressed in a state that the face image (F10) is selected as shown in FIG. 6(A), the game screen is updated to a compatibility determining screen on which the face image (F10) is placed at the center point C0 (not illustrated). On the compatibility determining screen, the face image of the center point C0 is a still image like other face images, and the compatibility with the face image of the center point C0 is constant, so that the position of each of the face image is not changed. On the other hand, with respect to the camera image F0 being a moving image, each of the positions is changed.

In addition, when the image map button B3 is pressed on the main game screen shown in FIG. 6(A) or FIG. 6(B), the game screen is updated to an image map screen as shown in FIG. 8. On the image map screen, two pairs of image words each pair of image word being opposed to each other are placed top and bottom, and right and left. The first pair of opposing image words is "carefree" versus "smart", and placed top and bottom of the screen. The second pair of opposing image words is "cute" versus "beautiful", and placed right and left of the screen. The image map is made up of a vertical axis A1 for indicating each face image by an arbitrary position between the first pair of image words, that is, "carefree" and "smart", and a horizontal axis A2 for indicating it by an arbitrary position between the second pair of image words, that is, "cute" and "beautiful".

A preset data memory 54 stores a plurality pairs of reference faces (a first pair of reference faces 84 corresponding to "carefree" versus "smart", the second pair of reference faces 86 corresponding to "cute" versus "beautiful" . . . ) each corresponding to a plurality pairs of the opposed image words as shown in FIG. 10(B), and on the image map, the two pairs arbitrarily selected from the plurality pairs of images words are placed. Each reference face is described by position data indicating positions of respective 55 feature points P1-P55 in this embodiment (see FIG. 11: described later).

The CPU 42 first decides a position (coordinate) in a vertical axis direction by comparing each face image with the first pair of reference faces 84 corresponding to the first pair of the image words placed up and bottom of the screen, and a position (coordinate) in a horizontal axis direction placed right and left is decided by comparing each face image with the second pair of reference faces 86 corresponding to the second pair of image words placed right and left of the screen. On the image map screen, a relevant face image is displayed at a position indicated by the pair of coordinates thus decided.

Furthermore, when the face-of-child-between two buttons B5 is pressed on the main game screen shown in FIG. 6(A) or FIG. 6(B), the game screen is updated to a child-between-two screen as shown in FIG. 9. The child-between-two screen includes a balance image 100, and on one scale 100a, an image which was selected on the main game screen, that is, the camera image or any one of the face images F51 is placed. Around the balance image 100, an image F53, and the like except for the image F51 which was selected out of the images developed within the active box 92A on the main game screen are displayed, and when any one of them is selected with the cursor, the selected image F52 is arranged on the other scale 100b of the balance. When a start operation is then performed, a "face-of-child-between two" image F50 is generated from these two images F51 and F52.

On the child-between-two screen, the "face-of-child-between two" image F50 thus generated is displayed greatly at the center. If the "face-of-child-between two" image F50 is more like than any one of the two images F51 and F52 weighed in the balance, the image being more like, that is, the image F51 here is enlarged, and the image F52 being less like is reduced. As a result, the scale is tilted, that is, the scale 100a on which the image F51 being more like is put is downward while the scale 100b on which the image F52 being less like is put is upward, in the balance image 100.

On the other hand, when a start operation is performed in a state that any selection of the face image is not performed on the child-between-two screen, that is, a face image is put on only one scale, a "child face" image is generated from this one image (F51, for example). The "child face" image thus generated (not illustrated) is displayed on the child-between-two screen.

FIG. 10 shows a memory map in a case that such a "smiling note game" is played. FIG. 10(A) shows a content of the main memory 48, and FIG. 10(B) shows a content of the preset data memory 54. Referring to FIG. 10(A), the main memory 48 is formed with a program area 48a and a data area 48b, and the program area 48a stores a main program 70 corresponding to the flowcharts in FIG. 12-FIG. 28. The main program 70 includes a determination (evaluation) program 72 corresponding to the flowchart in FIG. 14-FIG. 27 and an imaging program 74 corresponding to the flowchart in FIG. 28 as subroutines.

Figure 11:
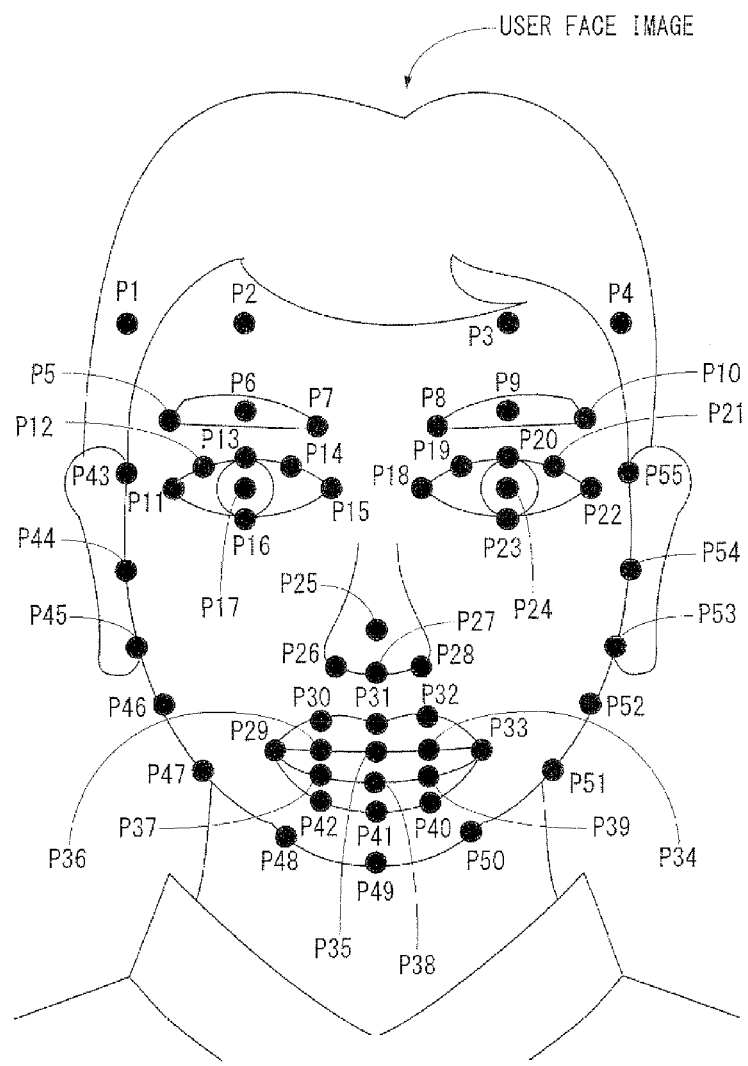
FIG. 11 is an illustrative view showing one example of feature points of a facial image.

The program area 48*a* further stores a feature point analyzing program 75 for analyzing feature points P1-P55 shown in FIG. 11, and an input-output controlling program 76 for performing input/output of images and voices and a touch input by controlling the I/F circuit 40, etc. Here, the feature point analyzing program 75 and the input-output controlling program 76 can employ the existing programs, and the detailed description is omitted.

On the other hand, the data area 48*b* includes an image area 78, a feature point area 80, a position area 82, etc. The image area 78 temporarily stores image data from the camera 16, and the feature point area 80 temporarily stores feature point data detected from the image data of the image area 78. The position area 82 stores position data indicating positions within the screen as to the camera image and each of the face images, that is, a facial image of the user which is being currently detected and each of the facial images of the other users which was detected and recorded in the past.

FIG. 11 shows one example of the feature points. Here, 55 feature points P1-P55 defined on the outline of the facial image of the user or predetermined positions on an image of each part, such as eyes, mouth, etc are utilized. The feature point data includes coordinate data indicating a current position of each of these feature points P1-P55.

Figure 12:
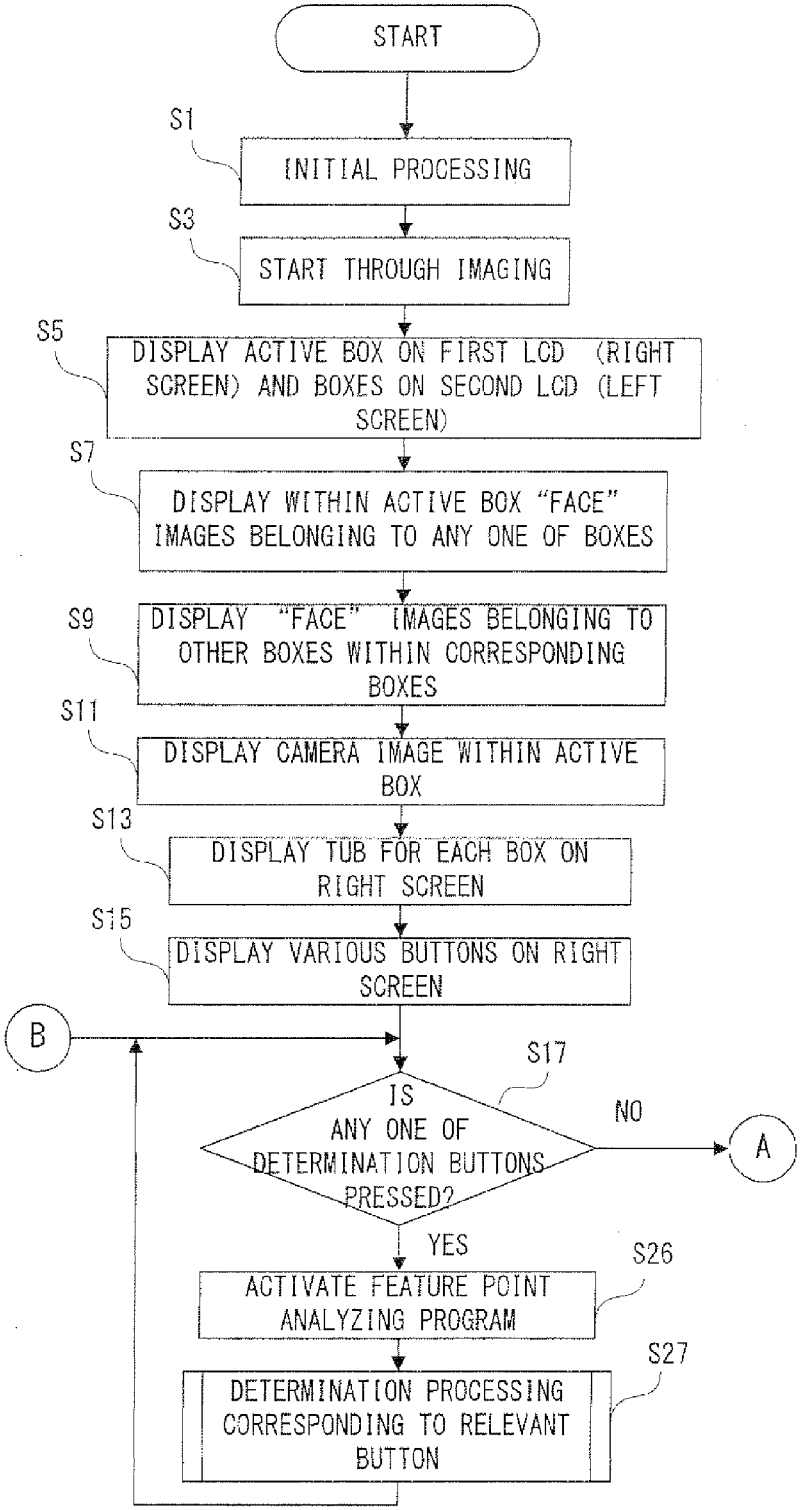
FIG. 12 is a flowchart showing a part of an operation by a CPU.
Figure 13:
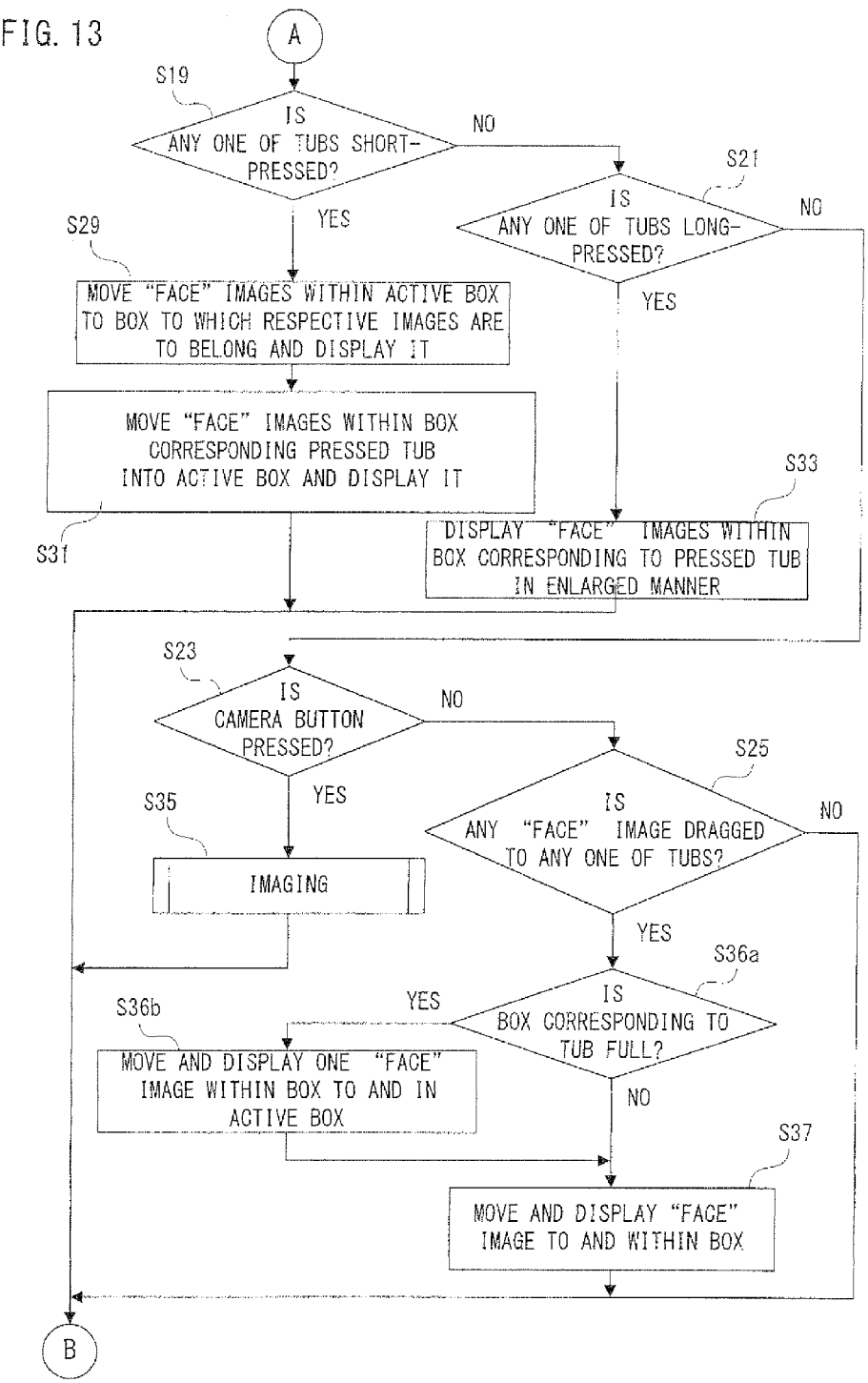
FIG. 13 is a flowchart showing another part of the operation by the CPU.

Referring to FIG. 12-FIG. 13, when the game is started, the CPU 42 first executes initial processing in a step S1. The initial processing includes processing of clearing the image area 78, the feature point area 80, and the position area 82. Next, a through imaging (that is, repetitive imaging or successive imaging) starting command is issued in a step S3. In response thereto, repetitive imaging by the camera 16 is started, and each frame of images obtained by the repetitive imaging are written to the image area 78 of the main memory 48. Here, the image area 78 has a size capable of storing a predetermined number of frames of image, and the image at the oldest frame is overwritten by the image of the latest frame within the image in the image area 78. Accordingly, a predetermined number of frames of image imaged immediate before are constantly stored in the image area 78. Thereafter, main game screens as shown in FIG. 6 is displayed on the LCDs 12 and 14 through a series of processing in steps S5-S15.

More specifically, in the step S5, the active box 92A is displayed on the first LCD 12, that is, the right screen 12, and seven out of the eight boxes 90*a*-90*h* respectively corresponding to eight groups (boxes 90*a*, 90*c*-90*h* in FIG. 6(A) example) are displayed on the second LCD 14, that is, the left screen 14. In the step S7, the face images (face images F1-F10 in FIG. 6(A)) belonging to the rest of the one group (box 90*b* in FIG. 6(A) example) out of the eight boxes 90*a*-90*h* are displayed in medium size within the active box 92A. In the next step S9, the face images belonging to the seven boxes on the left screen 14 are displayed within the corresponding box in small size. Then, in the step S11, the camera image F0, that is, the facial image of the user captured by the camera 16 is further displayed within the active box 92A. Additionally, in the step S13, the respective tubs 94*a*-94*h* each corresponding to boxes are displayed in the tub area 92B of the right screen 12 (one of the tubs 94*a*-94*h* is displayed in a manner different from the other sevens tubs so as to clearly show this is the tub which is being currently selected), and in the step S15, the various buttons (specifically, the camera button B0 and the determination buttons B1-B5, etc.) are displayed on the right screen 12 (within the active box 92A, here). Thereafter, through a processing loop in steps S17-S25, a touch operation performed on any one of the tubs (94*a*-94*h*) or the buttons (B0-B5) is detected via the touch panel 28.

That is, in the step S17, it is determined whether or not any one of the determination buttons B1-B5 is pressed, and it is determined whether or not any one of the tubs 94*a*-94*h* is short-pressed in the step S19, in the step S21, it is determined whether or not any one of the tubs 94*a*-94*h* is long-pressed, in the step S23, it is determined whether or not the camera button B0 is pressed, and in the step S25, it is determined whether or not any one of the face images F1, F2, . . . is dragged to any one of the tubs 94*a*-94*h*. If "YES" is determined in the step S17, the feature point analyzing program 75 is activated in a step S26, and the process shifts to a step S27 to execute determination processing corresponding to the pressed determination button. The feature point analyzing program 75 is executed in parallel with the main program by the CPU 42 to analyze the feature points P1-P55 shown in FIG. 11. Here, the detail of the determination processing ("today's compatibility", "image map" and "face-of-child-between two") is described later. After the examination, the process returns to the loop shown in the steps S17-S25.

If "YES" in the step S19, the face image is moved between the storing region 90 (boxes 90*a*-90*h*) and the active box 92A through a series of the processing in steps S29 and S31. That is, the face images (F1-F10, for example) within the active box 92A are moved to the box (box 90*b*, for example) to which they belong in the step S29 while the face images (F11-F20, for example) within the box (90*a*, for example) corresponding to the pressed tub (94*a*, for example) are moved to and displayed within the active box 92A in the step S31. After the movement, the process returns to the processing loop in the steps S17-S25.

If "YES" in the step S21, the face images within the box corresponding to the pressed tub (94*a*, for example) are displayed in an enlarged manner in situ. More specifically, when the tub 94*a* is long-pressed on the game screen in FIG. 6(A), the face images (these correspond to F11-F20 in FIG. 6(B)) within the box 90*a* are displayed in an enlarged manner from the small size to the medium size one by one from the left end in order, for example, during pressing the button. When the object to be enlarged reaches the right end, a similar operation is repeated from the left end.

If "YES" in the step S23, imaging processing (see FIG. 28: described later) is executed in a step S35, and thus, the camera image F0 is recorded as one new face image. After the imaging, the process returns to the processing loop in the steps S17-S25. If "YES" in the step S25, the process shifts to a step S36*a* to determine whether or not the box corresponding to the tub is full. If the number of face images stored in the box corresponding to the tub is less than a predetermined number, 10 here, "NO" is determined in the step S36*a*, and the process immediately proceeds to a step S37. Here, the predetermined number "10" is stored in the preset data memory 54, for example, similar to other constants to be referred by the CPU 24. On the other hand, if the number reaches 10, "YES" is determined in the step S36*a*, and the process proceeds to the step S37 through the processing in a step S36*b*.

In the step S36*b*, one of the face images stored within the box corresponding to the relevant tub is moved to and displayed within the active box 92A. In the step S37, the relevant face image is moved to the box corresponding to the tub so as to be displayed. For example, when the face image F1 is dragged to the tub 94*c* on the game screen in FIG. 6(A), there is a space within the box 90*c*, so that the face image F1 is stored within the box 90*c*. Furthermore, when the face image F2 is dragged to the tub 94a, the box 90a is full, so that any one of them (the face image at the left end, for example) is moved to the active box 92A, and then, the face image F2 is stored in the box 90a. After moving and displaying, the process returns to the processing loop in the steps S17-S25.

Figure 14:
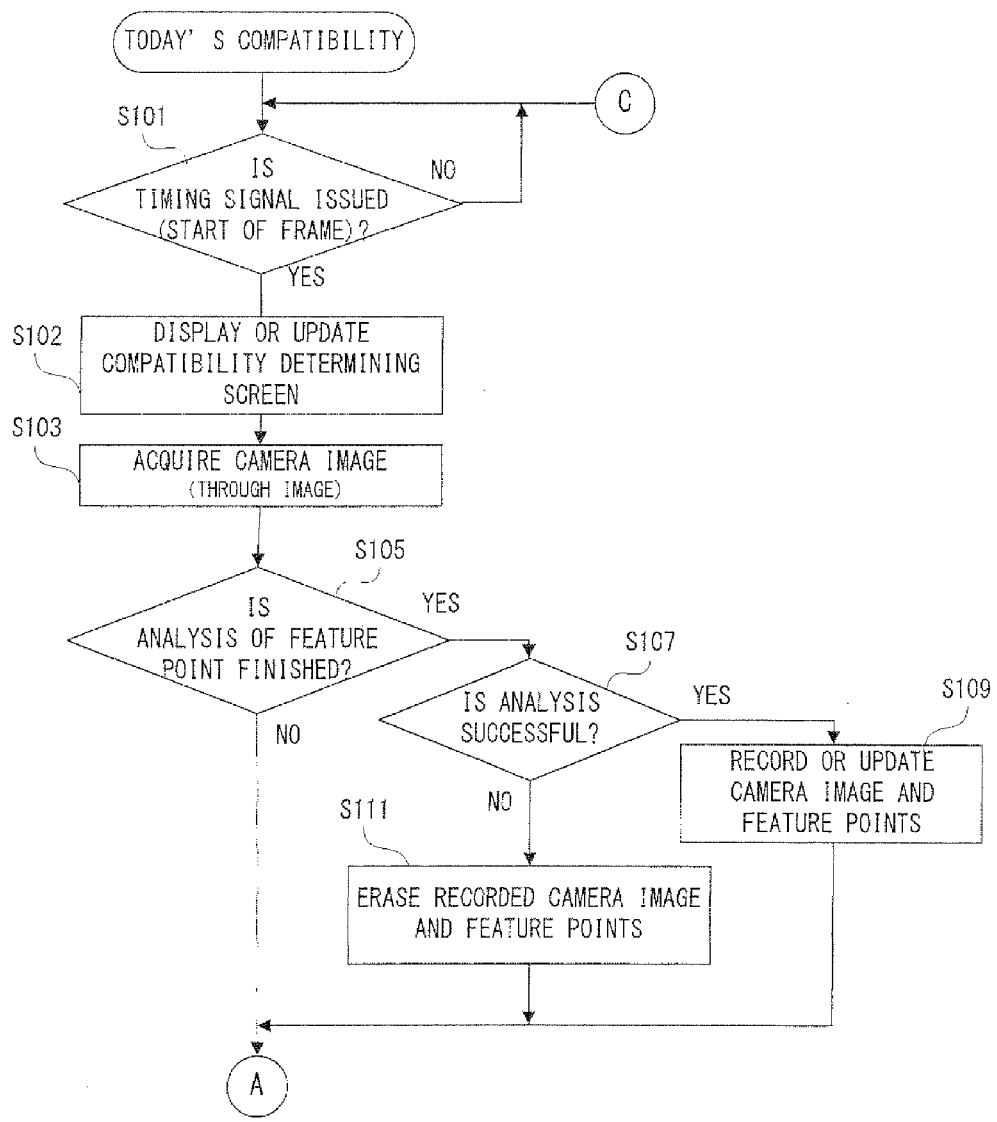
FIG. 14 is a flowchart showing a still another part of the operation by the CPU.
Figure 15:
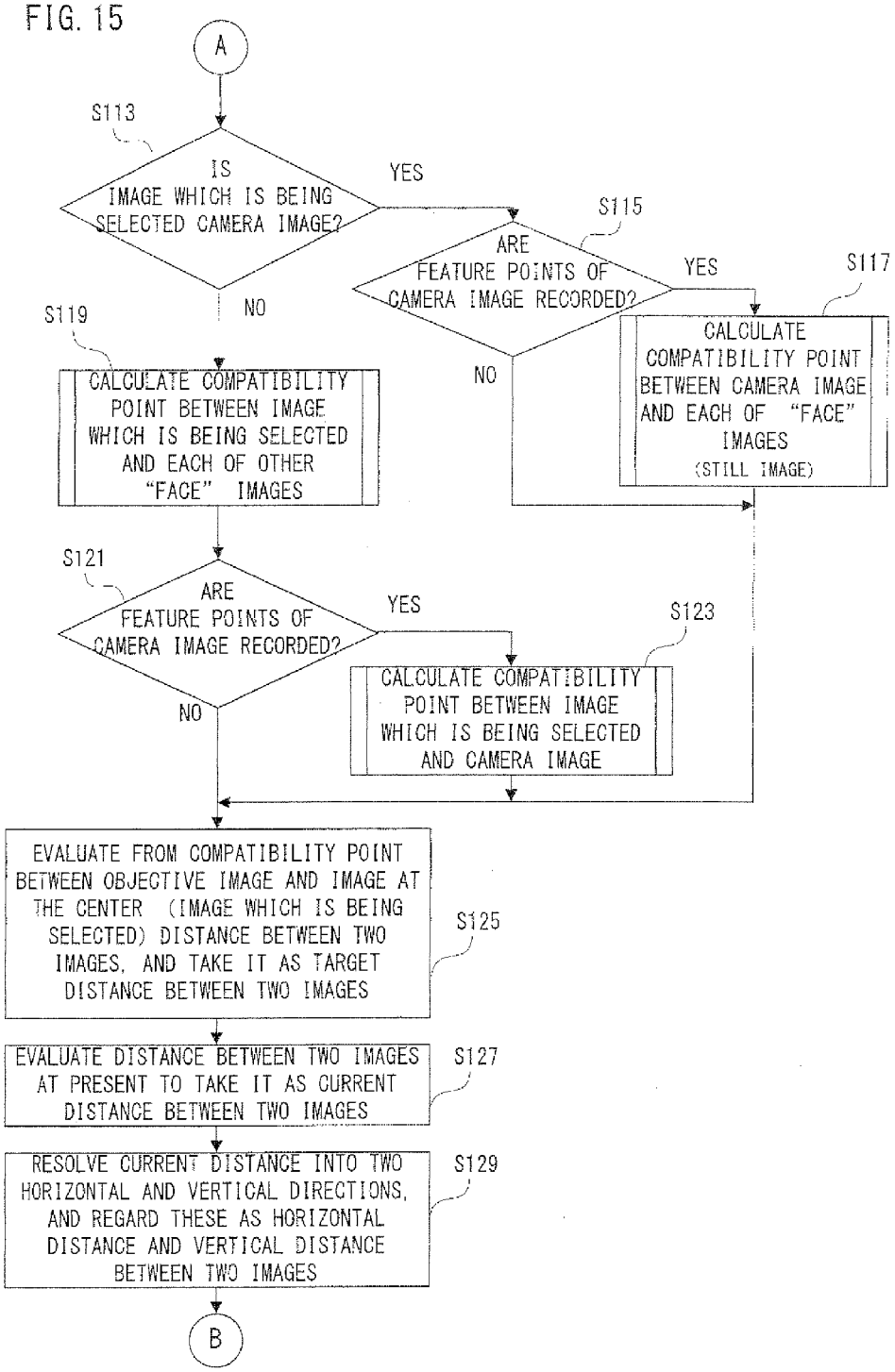
FIG. 15 is a flowchart showing a further part of the operation by the CPU.
Figure 16:
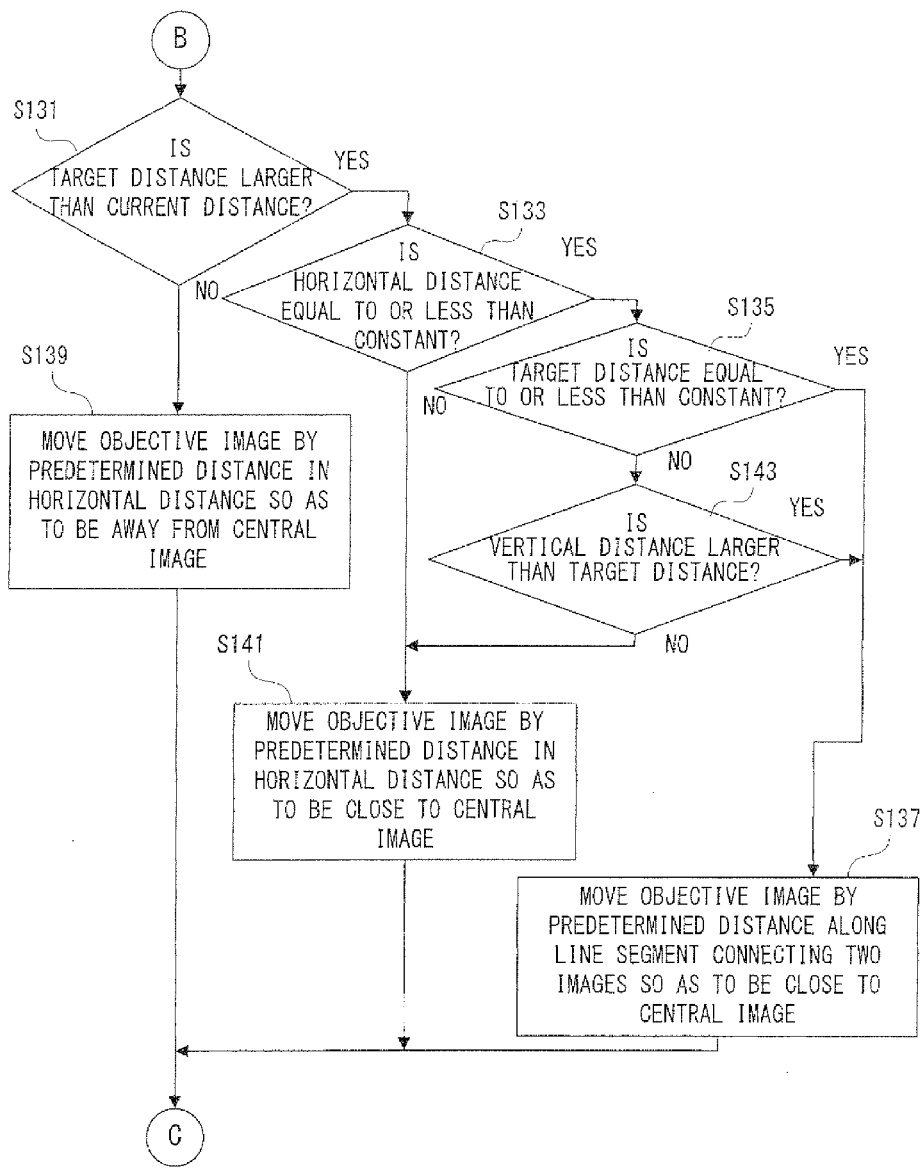
FIG. 16 is a flowchart showing a still further part of the operation by the CPU.

In a case that the determination button pressed in the aforementioned step S17 is the "today's compatibility" determination button B1, the detail of the determination processing to be executed in the step S27 becomes processing shown in FIG. 14-FIG. 17 for details. Referring first to FIG. 14-FIG. 16, the CPU 42 waits for a timing signal from the RTC 60 in a step S101, and when a timing signal is detected, the process shifts to a step S102 to display a compatibility determining screen like FIG. 6(A) on the LCDs 12 and 14. In a further step S103, a camera image corresponding to one frame out of the camera image temporarily stored in the image area 78 (see FIG. 10(A)) is acquired.

In a next step S105, it is determined whether or not an analysis of the feature points by the feature point analyzing program 75 is finished with respect to the camera image, and if "YES", the process shifts to a step S107 to determine whether or not the analysis is successful. If "YES" as well here, the camera image and the feature points obtained by analyzing it are respectively recorded in the image area 78 and the feature point area 80 in a step S109. In other words, the camera image and feature points which are recorded in the preceding frame are updated by the latest camera image and feature points here. If "NO" in the step S107, the camera image and the feature points obtained by analyzing it are erased in a step S111. After recording or erasing, the process proceeds to a step S113.

In the step S113, it is determined whether or not the image which is being selected within the active box 92A is the camera image (F0: see FIG. 6(B)), and if "YES" here, it is further determined whether or not the feature points of the camera image are recorded in a step S115. If "YES" here as well, a compatibility point between the camera image and each face image is calculated in a step S117, and then, the process proceeds to a step S125. If "NO" in the step S115, the process in the step S117 is skipped, and the process proceeds to the step S125. Here, details of the compatibility point calculating processing are described later.

On the other hand, if the image except for the camera image, that is, any one of the face images (F10, for example: see FIG. 6(A)) is selected, "NO" is determined in the step S113 to shift to a step S119. A compatibility point is calculated between the face image which is being selected and each of the other face images in the step S119. Then, it is determined whether or not the feature points of the camera image are recorded in a step S121, and if "YES", a compatibility point is calculated between the face image which is being selected and the camera image in a step S123, and then, the process proceeds to the step S125. If "NO" in the step S121, the step S123 is skipped to proceed to the step S125.

In the step S125, from the compatibility point between the object image and the central image (between each face image F31, F32, . . . and the camera image F0 at the center point C0 on the game screen in FIG. 7(A)), the distance between these two images is evaluated to be regarded as a target distance between the two images. In a next step S127, a distance between the two images at the present is evaluated, and this is regarded as a current distance between the two images. In a next step S129, the current distance is resolved into two horizontal and vertical directions (direction of the vertical axis A1 and the direction of the horizontal axis A2), and these directions are regarded as a horizontal distance and a vertical distance between the two images. By the processing through steps S131-S143, the object image is moved on the basis of the target distance, the horizontal distance, and the vertical distance.

More specifically, in the step S131, it is determined whether or not the target distance is larger than the current distance, and if "YES", it is further determined whether or not the horizontal distance is equal to or less than a constant in the step S133. If "YES" here as well, the process shifts to the step S135 to further determine whether or not the target distance is equal to or less than the constant. Then, if "YES" in the step S135, the process proceeds to the step S137 to move the objective image by a predetermined distance along the line segment connecting the two images so as to be close to the central image. After the movement, the process returns to the step S101.

If "NO" in the step S131, the process proceeds to the step S139 to move the objective image by a predetermined distance in the horizontal direction so as to be away from the central image (center point C0), and then, the process returns to the step S101. If "NO" in the step S133, the objective image is moved in the horizontal direction by a predetermined distance so as to be close to the central image in the step S141, and then, the process returns to the step S101. If "NO" in the step S135, it is further determined whether or not the vertical distance is larger than the target distance in the step S143, and if "NO" here, the process returns to the step S101 through the aforementioned step S141. If "YES" in the step S143, the process returns to the step S101 through the aforementioned step S137.

The movement processing in the above-described step S137-S141 is a movement based on the position data stored in the position area 82, and the movement on the screen is realized by the next step S102. That is, the CPU 42 shifts from the step S101 to the step S102 in response to a next timing signal to update the display screen on the basis of the position data. Thus, the camera image and each of the face images are moved within the screen. Then, in a step S203, an image corresponding to the next frame is acquired to repeat similar processing.

Figure 17:
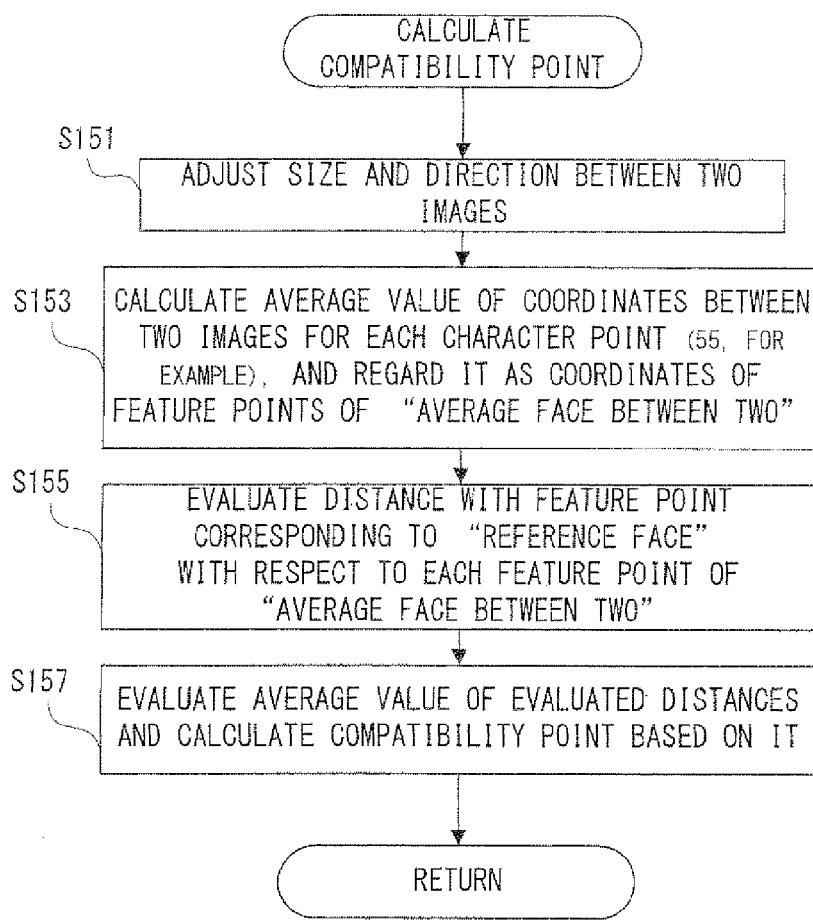
FIG. 17 is a flowchart showing another part of the operation by the CPU.

The compatibility point calculating processing in the aforementioned steps S117, S119 and S123 is executed in procedure in FIG. 17 for details. Referring to FIG. 17, in a first step S151, the size and the direction are adjusted so as to be coincident with each other between the two images. In a next step S153, an average value of the coordinates is evaluated for each feature points P1-P55 (see FIG. 11) between the two images, and each of these coordinates are regarded as coordinates of the feature points P1-P55 of the "average face between the two". In a next step S155, with respect to each of the feature points P1-P55 in the "average face between the two", a distance to each of the corresponding feature points in the "reference face" is evaluated. The average value of the 55 distances thus evaluated is calculated in a step S157, and the compatibility point is calculated on the basis of the average value. After the calculation, the process is restored to the routine at the hierarchical upper level (FIG. 14-FIG. 16).

In a case that the determination button pressed in the above-described step S17 is the "image map" determination button B3, the determination processing executed in the step S27 is as shown in FIG. 18-FIG. 22 for details. First, referring to FIG. 18-FIG. 19, the CPU 42 first calculates a score with respect to each image word for each face image in a step S201. Next, from the score with respect to the displayed image word ("carefree" versus "smart" and "cute" versus "beautiful" on the game screen in FIG. 8), coordinates as a moving target of each face image are evaluated in a step S203. The details of the steps S201 and S203 are described later. Thereafter, in a step S205, a timing signal from the RTC 60 is waited, and when a timing signal is detected, an image map screen is displayed (or updated) in a step S206, and then, the process shifts to a step S207 to acquire a camera image corresponding to one frame out of the camera image temporarily stored in the image area 78. In a next step S209, it is determined whether or not the image word which is being displayed is switched to another image word, and if "YES" here, the process shifts to a step S211 to evaluate coordinates as target coordinates of each face image from the score with respect to the image word (that is, switched image word) which is being displayed, and then, the process proceeds to a step S213. If "NO" in the step S209, the process skips the step S211 to proceed to the step S213.

In the step S213, it is determined whether or not the analysis of the feature points according to the feature point analyzing program 75 with respect to the camera image acquired in the step S207 is finished, and if "YES", the process shifts to a step S215 to further determine whether or not the analysis is successful. If "YES" here as well, the camera image and the feature points obtained by analyzing it are respectively stored in the image area 78 and the feature point area 80 in a step S217. Next, the score of the camera image with respect to the image word which is being displayed is calculated in a step S218, and coordinates of the camera image as a moving target are evaluated from the score with respect to the image word which is being displayed in a step S219. Then, the process proceeds to a step S225. Here, the detail in the steps S218 and S219 is described later.

If "NO" in the step S213, the process directly proceeds to the step S225. If "NO" in the step S215, the camera image and the feature points obtained by analyzing it are erased in a step S221. Then, in a step S223, with respect to the camera image, predetermined fixed coordinates are taken as coordinates of the moving target, and then, the process proceeds to the step S225.

In the step S225, by updating the position data of the position area 82 on the basis of the coordinates evaluated in the step S211, S219 or S223, the camera image and each of the face images are moved based on the position data. After the movement, the process returns to the step S205. When a timing signal is detected here, the process shifts to a step S206 to update an image map screen with reference to the position data. Thus, the camera image and each of the face image (images F41, F42, . . . on the screen in FIG. 8) are moved within the image map screen. Then, in the step S207, an image corresponding to the next frame is acquired to repeat similar processing.

Figure 20:
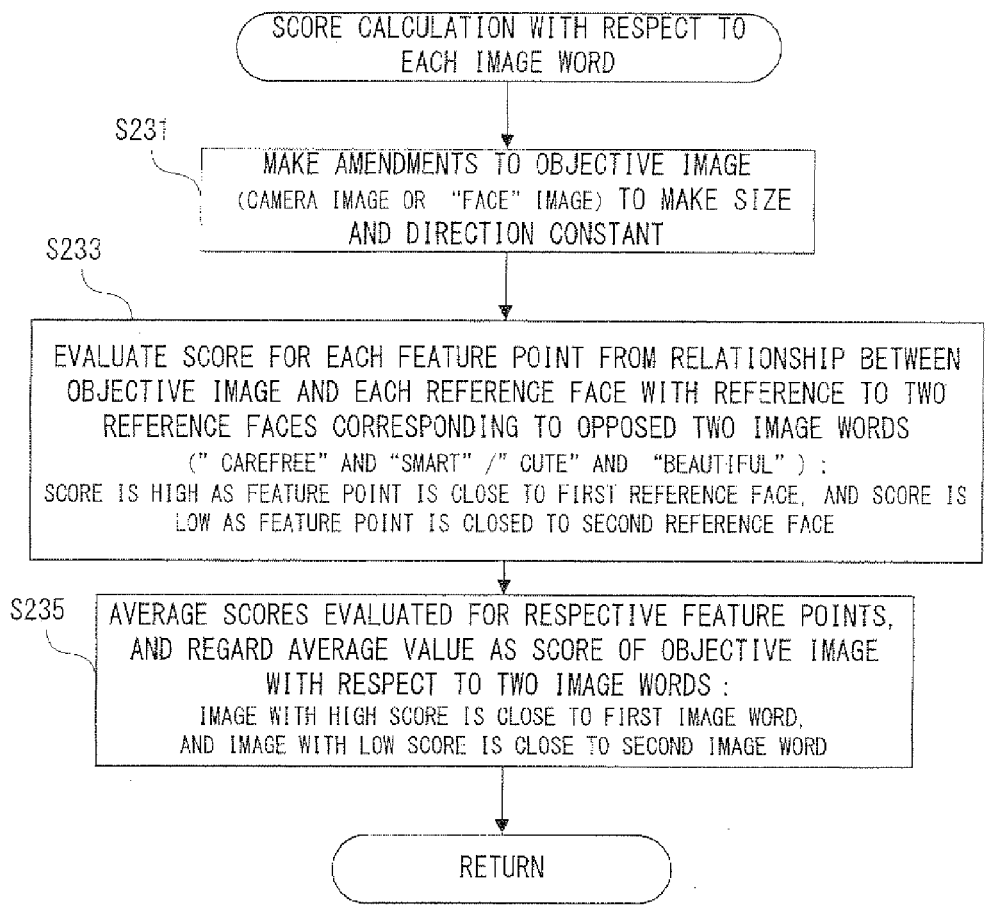
FIG. 20 is a flowchart showing a still further part of the operation by the CPU.

Details of the score calculating processing in the aforementioned step S201 or S208 is executed according to a procedure in FIG. 20 for details. Referring to FIG. 20, the CPU 42 makes amendments to the objective image, that is, the camera image or the face image so as to make the size and direction constant in a first step S231. In a next step S233, with reference to arbitrary two (the first pair of the reference faces 84 and the second pair of the reference faces 86, for example) out of a plurality of pairs of reference faces stored in the preset data memory 54, a score in a vertical axis A1 direction and a horizontal axis A2 direction is evaluated for each feature point from the relationship between the objective image and each reference face. The score is decided so as to be higher as the feature point is closer to one (first reference face) out of the two opposing reference faces, and so as to be lower as the feature point is closer to the other (second reference face).

Figure 18:
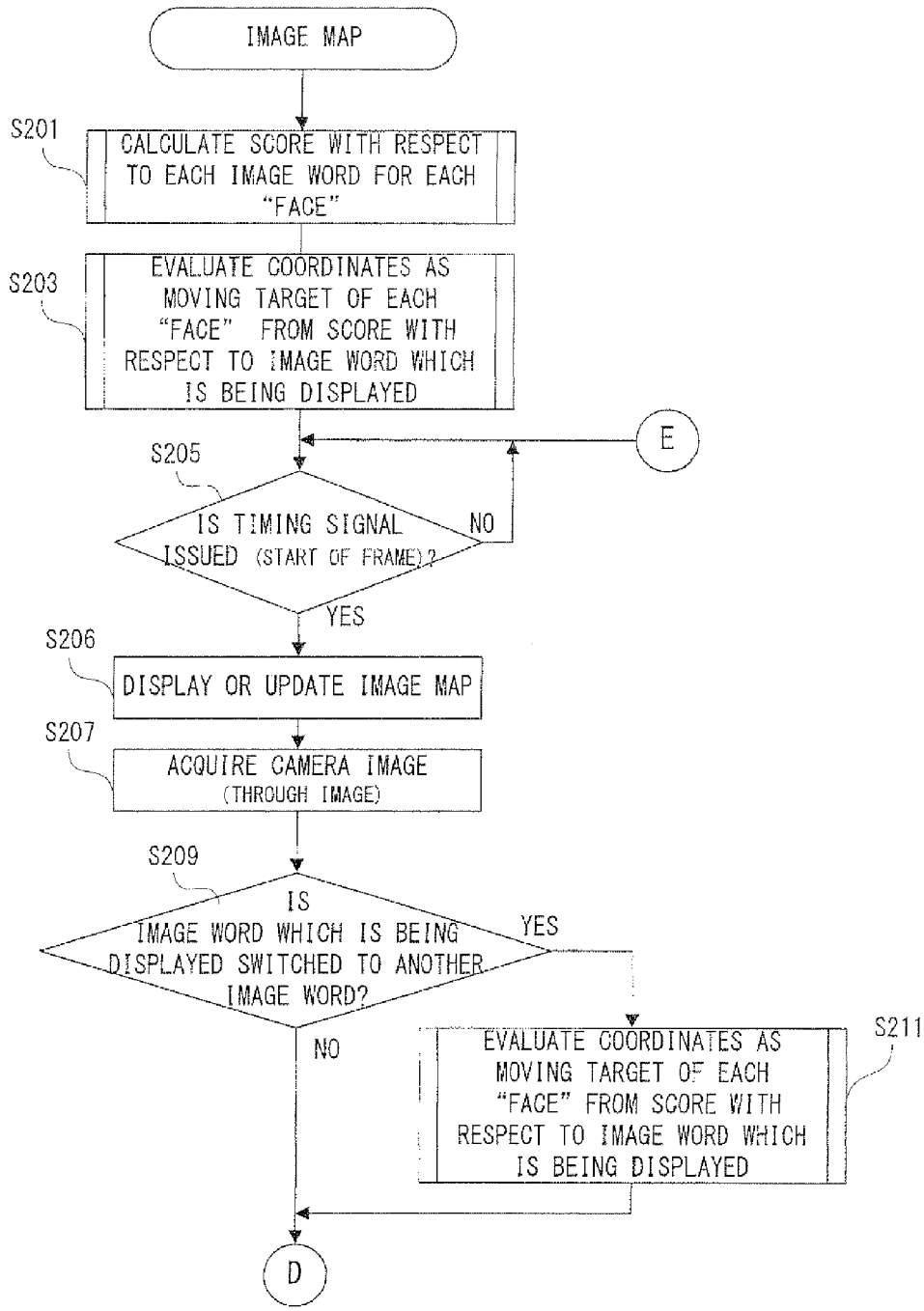
FIG. 18 is a flowchart showing a still another part of the operation by the CPU.
Figure 19:
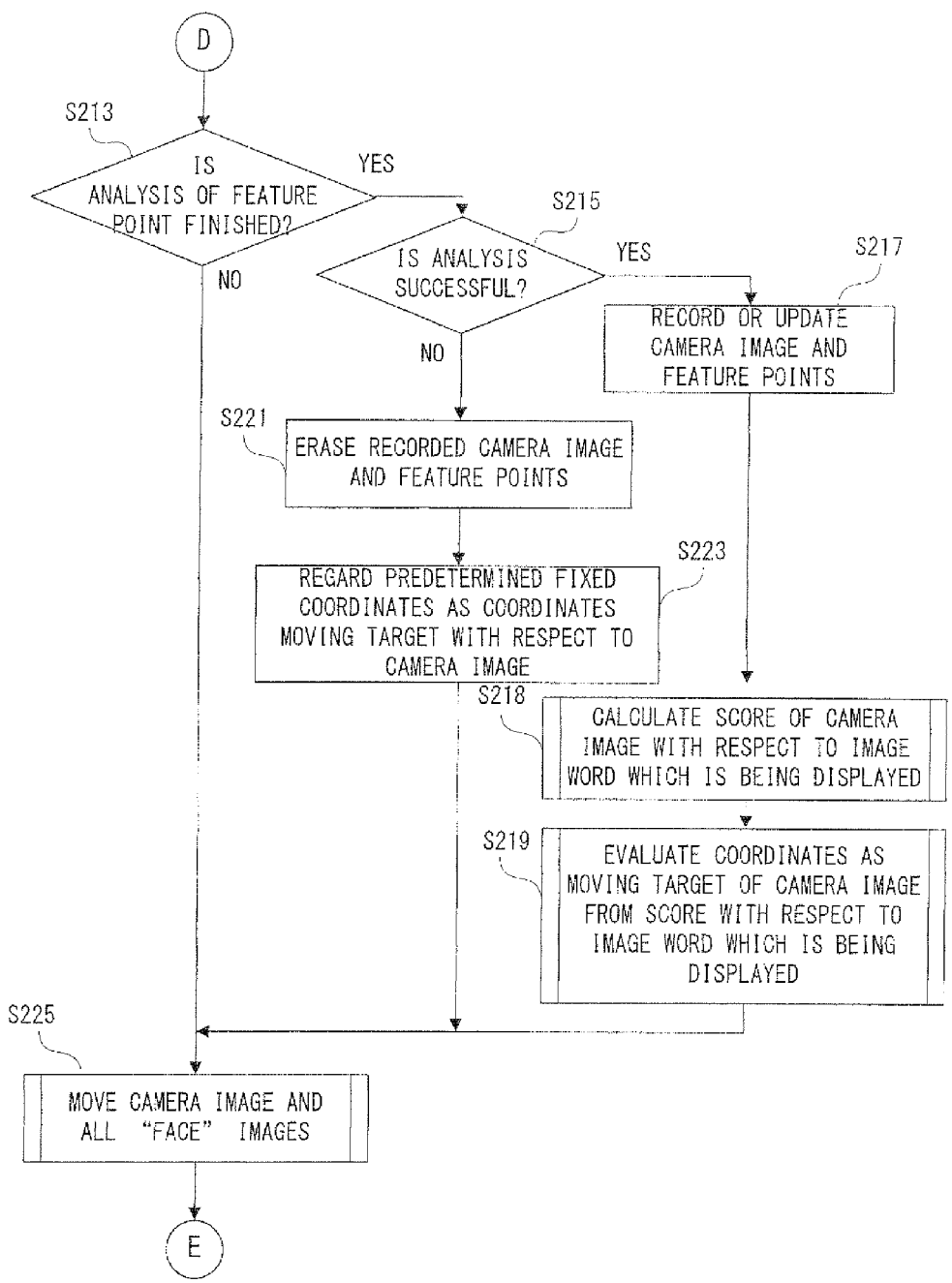
FIG. 19 is a flowchart showing a further part of the operation by the CPU.

In a next step S235, scores evaluated for respective feature points are averaged, and the obtained average value is taken as a score of the objective image with respect to the two image words. Accordingly, the image with a higher score is closer to the first image word corresponding to the first reference face, and the image with a lower score is closer to the second image word corresponding to the second reference face. After the score calculation, the process is restored to the routine at the hierarchical upper level (FIG. 18-FIG. 19).

Figure 21:
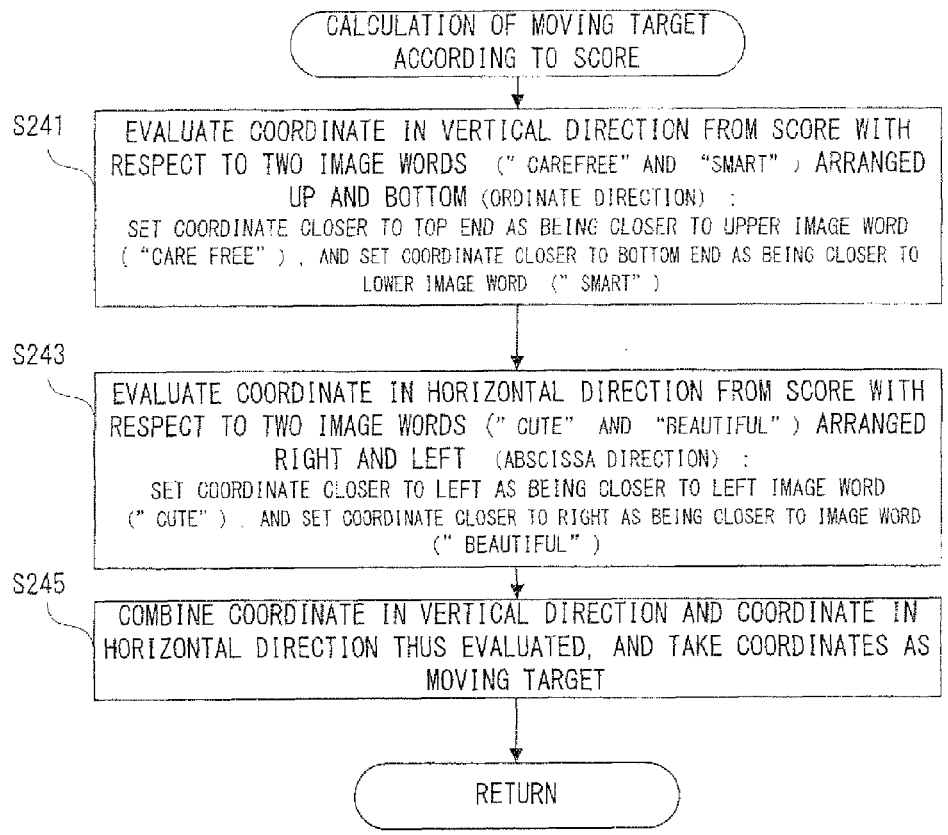
FIG. 21 is a flowchart showing another part of the operation by the CPU.

Details of the calculation processing of the moving target according to the score in the aforementioned steps S203, S211, and S219 is executed in procedure in FIG. 21 for details. Referring to FIG. 21, the CPU 42 evaluates a coordinate in the vertical axis A1 direction from the score with respect to the two image words ("carefree" and "smart" on the screen in FIG. 8) arranged up and down (vertical axis direction) on the screen in a first step S241. The coordinate in the vertical axis A1 direction is set to be a value closer to the top end of the screen (small value, for example) as being closer to the upper image word, that is, "carefree", and set to a value closer to the bottom end of the screen (large value, for example) as being closer to the lower image word, that is, "smart".

In a next step S243, from the score with respect to the two image words ("cute" and "beautiful" on the screen in FIG. 8) arranged right and left on the image map (horizontal axis A2 direction), a coordinate in the horizontal axis A2 is evaluated. The coordinate in the horizontal axis A2 direction is set to be a value closer to a left end of the screen (small value, for example) as being closer to the image word at the left, that is, "cute", and set to be a value closer to a right end of the screen (large value, for example) as being closer to the image word at the right, that is, "beautiful". Then, in a step S245, the coordinate (X) in the vertical axis A1 direction and the coordinate (y) in the horizontal axis A2 direction thus evaluated are combined to take it as coordinates (x, y) of the moving target. After the calculation, the process is restored to the routine at the hierarchical upper level (FIG. 18-FIG. 19).

Figure 22:
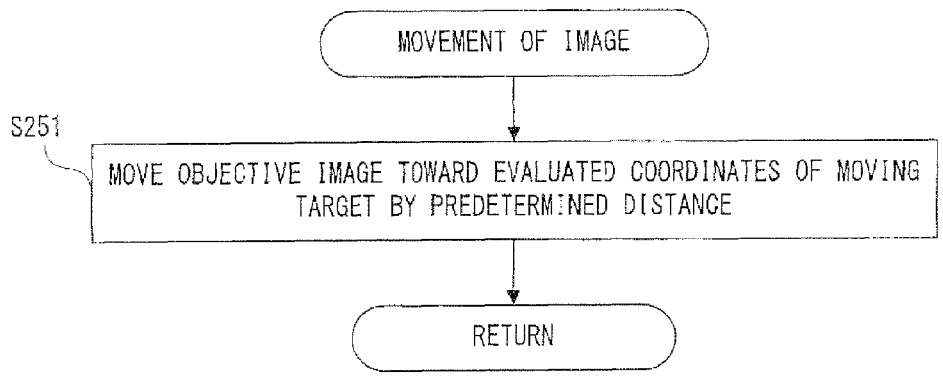
FIG. 22 is a flowchart showing a still another part of the operation by the CPU.

The image movement processing in the aforementioned step S225 is executed in procedure in FIG. 22 for details. Referring to FIG. 22, by updating the position data in the position area 82 on the basis of the coordinates of the moving target calculated according to the flowchart in FIG. 21, the CPU 42 moves the objective image toward the coordinates of the moving target in a step S251. After the movement, the process is restored to the routine at the hierarchical upper level (FIG. 18-FIG. 19). Such a movement of the target is reflected on the image map screen through the screen update processing in the step S206 after the restoration.

Figure 23:
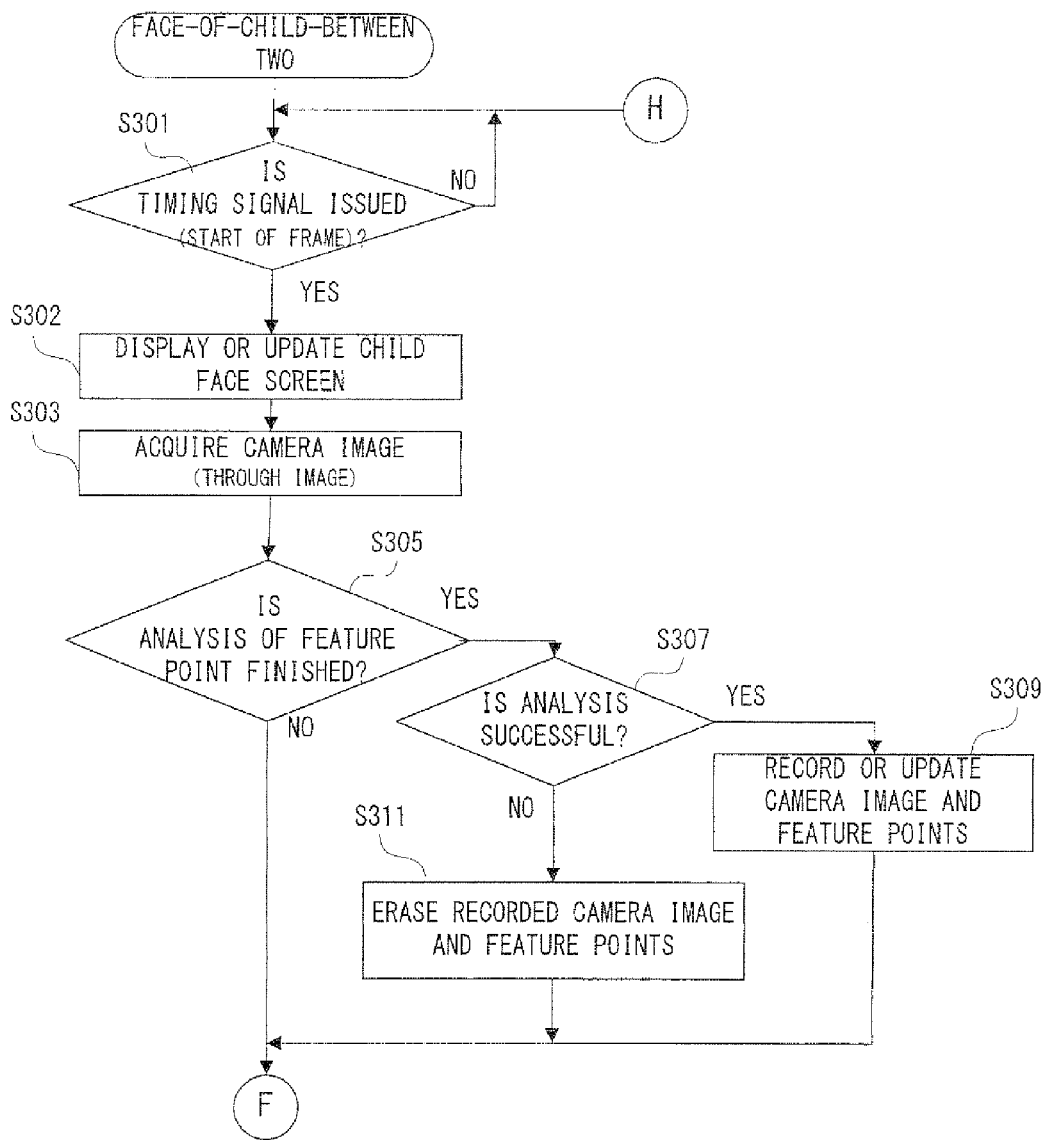
FIG. 23 is a flowchart showing a further part of the operation by the CPU.
Figure 24:
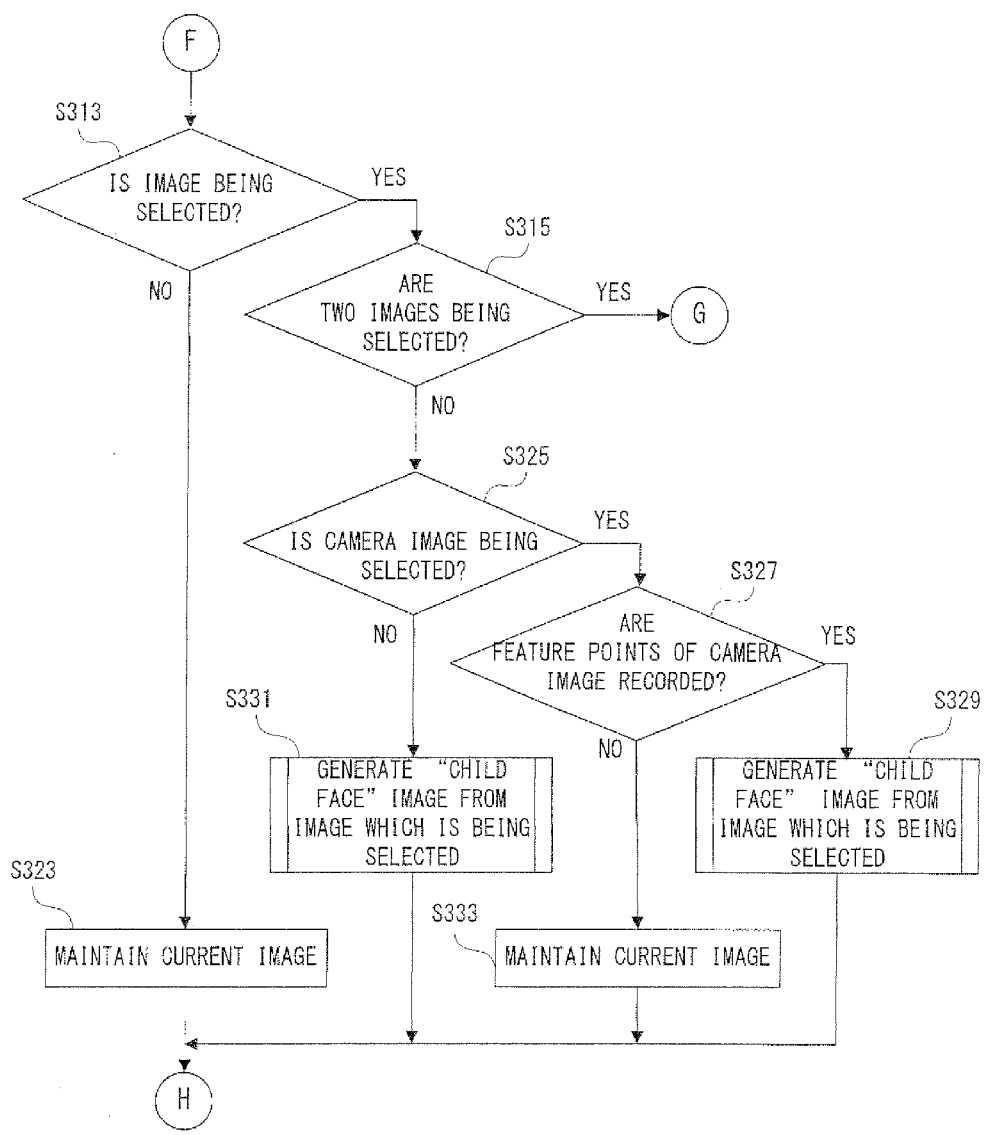
FIG. 24 is a flowchart showing a still another part of the operation by the CPU.
Figure 25:
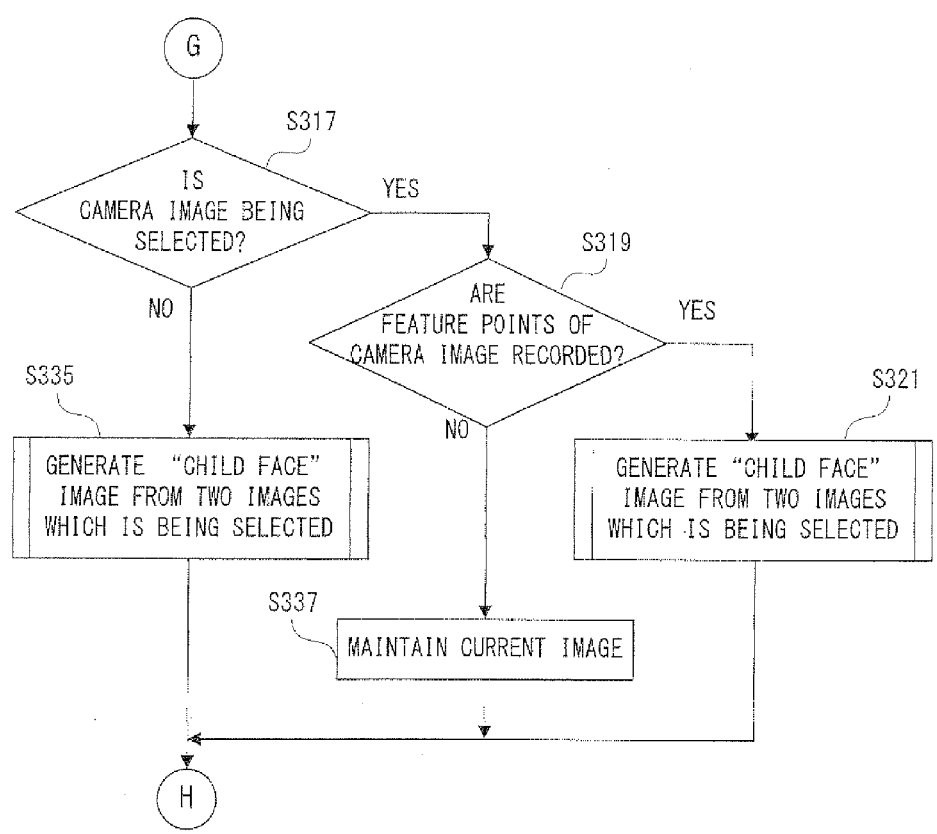
FIG. 25 is a flowchart showing another part of the operation by the CPU.

In a case that the determination button pressed in the aforementioned step S17 is the "face-of-child-between two" determination button B5, the determination processing to be executed in the step S27 is processing in FIG. 23-FIG. 27 for details. Referring first to FIG. 23-FIG. 25, the CPU 42 first waits for a timing signal in a step S301, and when detecting a timing signal, the CPU 42 advances the process to a step S302 to display (or update) the child-between-two screen as shown in FIG. 9 on the LCDs 12 and 14, and in a further step S303, a camera image corresponding to one frame out of the camera image temporarily stored in the image area 78 is acquired.

In a next step S305, it is determined whether or not the analysis of the feature points with respect to the camera image according to the feature point analyzing program 75 has been finished, and if "YES", the process shifts to a step S307 to further determine the analysis is successful. If "YES" here as well, the camera image and the feature points obtained by analyzing it are respectively stored the image area 78 and the feature point area 80 in a step S309. If "NO" in the step S307, the camera image and the feature points obtained by analyzing it are erased in a step S311. After recording or erasing, the process proceeds to a step S313.

In the step S313, it is determined whether or not an image is being selected on the child-between-two screen, and if "YES" in the step S313, the process shifts to a step S315 to further determine whether or not two images are being selected. If "YES" in the step S315, the process shifts to a step S317 to further determine whether or not the camera image is being selected. If "YES" in the step S317 as well, the process shifts to a step S319 to further determine whether or not the feature points of the camera image are recorded. Then, if "YES" in the step S319, the process shifts to a step S321 to generate a "face-of-child-between two" image from the two selected images. Here, details of the image generating processing in the step S321 and in steps S329, S331 and S335 described later are described later. After the generation, the process returns to the step S301.

If "NO" in the step S313, the process returns to the step S301 through a step S323. In the step S323, the current image is maintained without a new image being generated.

If "NO" in the step S315, the process shifts to a step S325 to further determine the camera image is being selected. If "YES" in the step S325, the process shifts to a step S327 to further determine whether or not the feature points of the camera image are recorded. If "YES" in the step S327, the process shifts to a step S329 to generate a child face image from the image which is being selected (camera image), and then, the process returns to the step S301. If "NO" in the step S325, the process shifts to a step S331 to generate a child face image from the image which is being selected (one face image), and the process returns to the step S301. If "NO" in the step S327, the process returns to the step S301 through a step S333. In the step S333, the current image is maintained without a new image being generated.

If "NO" in the step S317, the process shifts to a step S335 to generate a "face-of-child-between two" image from the images (two face images) which are being selected, and then, the process returns to the step S301. If "NO" in the step S319, the process returns to the step S301 through a step S337. In the step S337, the current image is maintained without a new image being generated.

Then, in the step S301, a timing signal is waited, and the process shifts to the step S302 to update the child-between-two screen with reference to the image generated in the aforementioned step S321, S329, S331 or S335. Thereafter, in the step S303, an image corresponding to the next frame is acquired to repeat similar processing onward.

Figure 26:
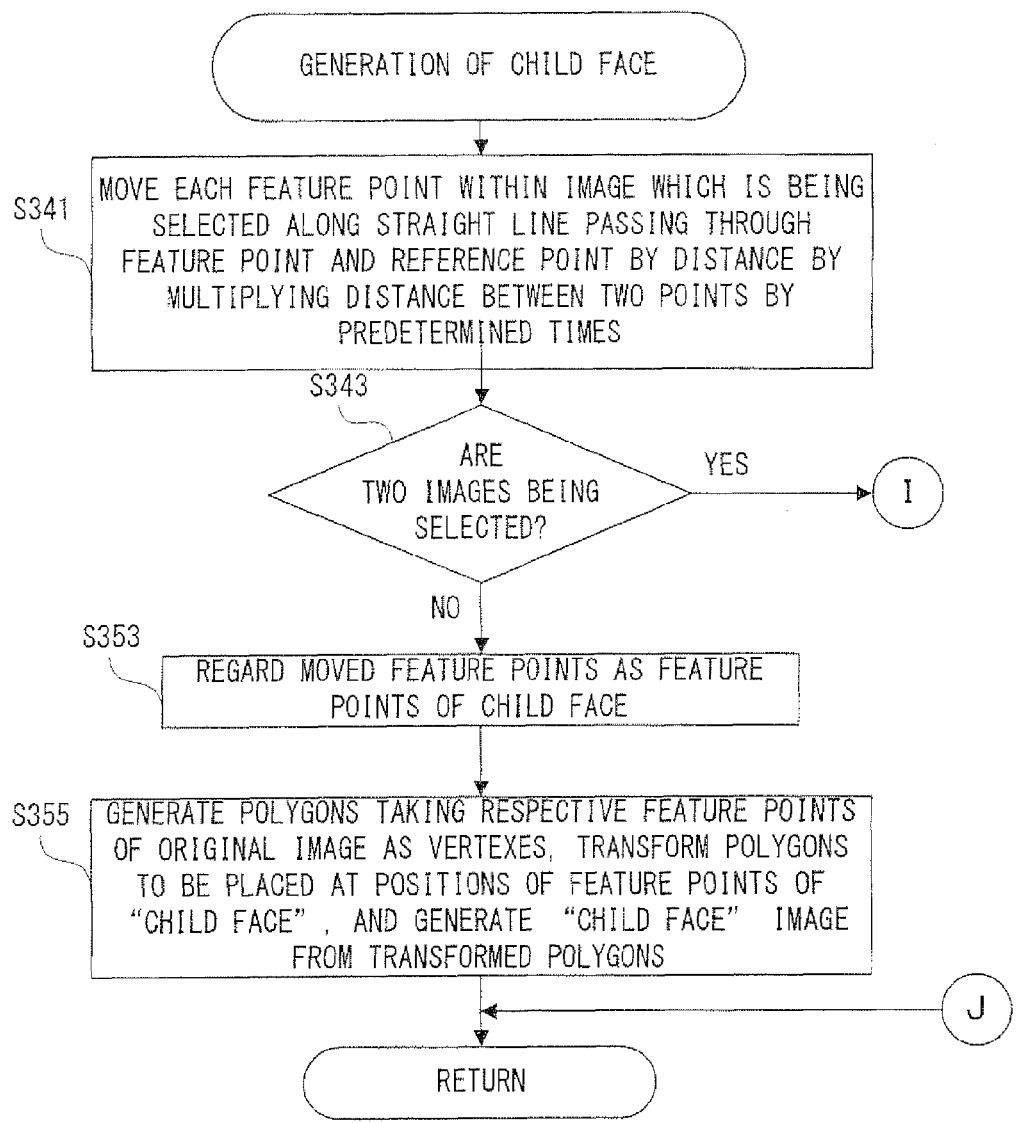
FIG. 26 is a flowchart showing a still another part of the operation by the CPU.
Figure 27:
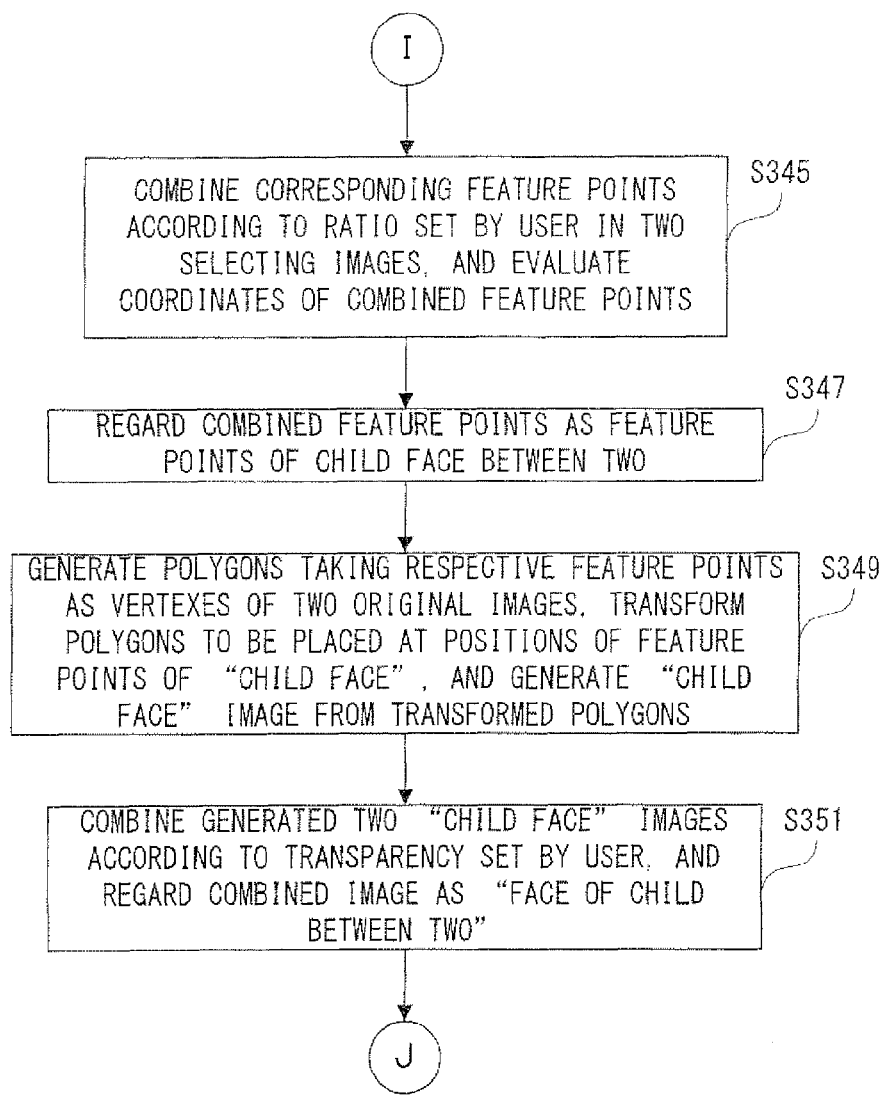
FIG. 27 is a flowchart showing a further part of the operation by the CPU.

The image generating processing in the aforementioned step S321, S329, S331 or S335 is executed according to the procedure in FIG. 26 and FIG. 27 for details. Referring to FIG. 26 and FIG. 27, the CPU 42 moves each of the feature points within the image which is being selected along a straight line passing through the feature point and the reference point by a distance obtained by multiplying the distance between the two points by predetermined times in a first step S341. In a next step S343, it is determined whether or not two images are being selected, and if "YES" here, a face-of-child-between two images is generated from the two images through a series of processing in the steps S345-S351, and the process is restored to the routine at the hierarchical upper level (FIG. 23-FIG. 25).

In the step S345, between the two selecting images, corresponding feature points are combined according to a ratio set by the user, and coordinates of the combined feature point are evaluated. More specifically, assuming that the coordinates of the feature point P1 of the one image are (x1, y1), the coordinates of the feature point P1 of the other image are (x2, y2), and a set ratio is 2:1, the combined coordinates of the feature point P1 are calculated as an internally dividing point between the two points as follows;

$$((2*x1+1*x2)/(2+1),(2*y1+1*y2)/(2+1)).$$

In a step S347, the combined feature points are regarded as feature points of the face-of-child-between two. In a step S349, following processing is performed on each of the two original images. First, polygons taking the respective feature points as vertexes are generated, the generated polygons are transformed to be placed at positions of the respective vertexes of the "child face" image, and a "child face" image is generated from the transformed polygons. In a step S351, the two "child face" images thus generated from the two original images are combined according to transparency corresponding to a ratio set by the user, and the combined image is regarded as a "face-of-child-between two" image.

On the other hand, if "NO" in the step S343, a child face image is generated from the one image through the processing in steps S353 and S355, and the process returns to the routine at the hierarchical upper level. In the step S353, the feature points moved in the step S341 are regarded as feature points of the child face. In the step S355, polygons taking the respective feature points of the original image as vertexes are generated, the generated polygons are transformed to be placed at positions of the respective vertexes of the "child face" image, and a "child face" image is generated from the transformed polygons. After the generation, the process is restored to the routine at the hierarchical upper level (FIG. 23-FIG. 25).

Figure 28:
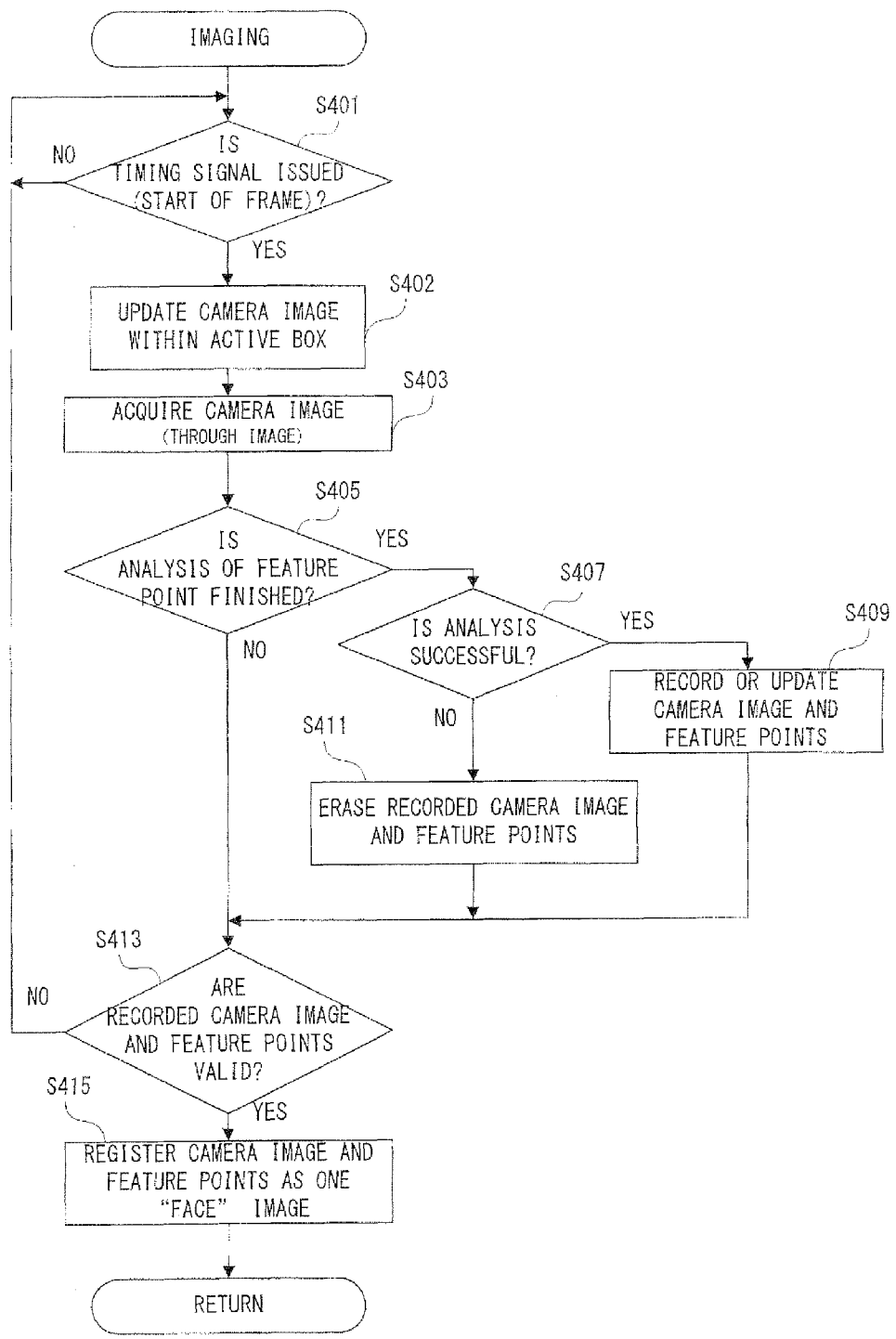
FIG. 28 is a flowchart showing a still further part of the operation by the CPU.

The imaging processing in the above-described step S28 is executed according to a procedure in FIG. 28 for details. Referring to FIG. 28, the CPU 42 waits for a generation of a timing signal in a step S401, proceeds to a step S402 to update the camera image (F0) within the active box 92A, and moreover acquires a camera image corresponding to one frame out of the camera image temporarily stored in the image area 78 in a step S403.

In a next step S405, it is determined whether or not an analysis of the feature points according to the feature point analyzing program 75 is determined with respect to the camera image, and if "YES", the process shifts to a step S407 to further determine whether or not the analysis is successful. If "YES" is determined here, the camera image and the feature points obtained by analyzing it are respectively recorded in the image area 78 and the feature point area 80 in a step S409. If "NO" in the step S407, the camera image and the feature points obtained by analyzing it are erased in a step S411. After recording or erasing, the process proceeds to a step S413.

In the step S413, it is determined whether or not the camera image and the feature points respectively recorded in the image area 78 and the feature point area 80 are valid. If the camera image is not clear, or if the positions of the feature points are out of the predetermined range, "NO" is determined in the step S413, and the process returns to the step S401 to perform similar processing on an image at a next frame. If the camera image and the feature points fulfill the invalid conditions as described above, "YES" is determined in the step S413, and the process shifts to a step S415 to register the camera image and the feature point as one face image. The face image thus registered is taken as belonging to the group the same as the face images which is being currently displayed within the active box 92A. After the registration, the process is restored to the routine at the hierarchical upper level (FIG. 12 and FIG. 13).

Figure 29:
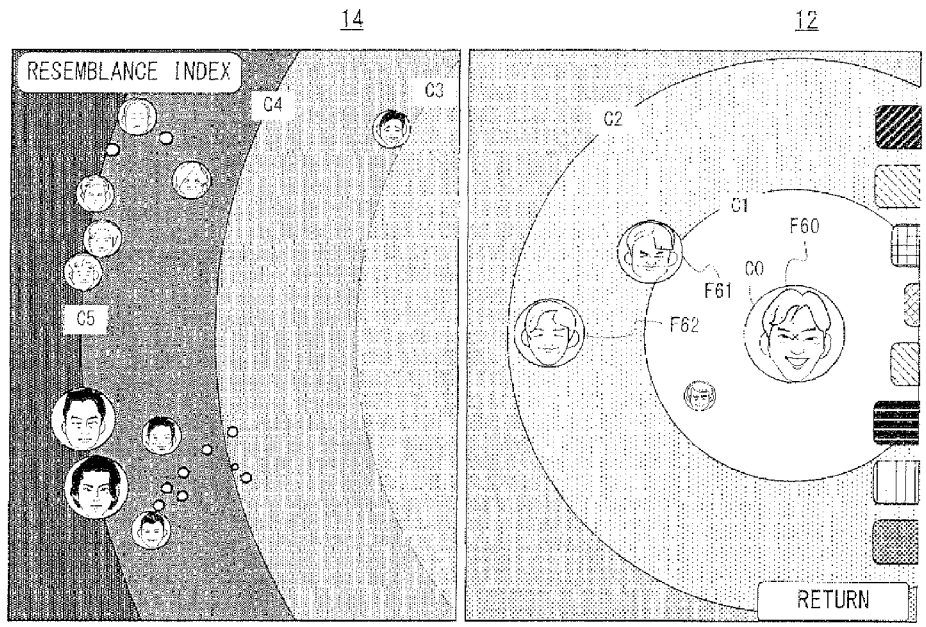
FIG. 29 is an illustrative view showing one example of a game screen to perform a resemblance index determination.

In addition, when the "resemblance index" determination button B2 is pressed on the main game screen as shown in FIG. 6(A) or FIG. 6(B), the game screen is updated to a resemblance index screen as shown in FIG. 29. On the resemblance index screen, the image F60 which is selected on the main game screen is arranged at the center point C0, and the other images F61, F62, ... within the active box 92F and the images within respective boxes 90a, 90b, ... are displayed at positions by distances corresponding to the resemblance index (degree of resemblance) from the image F60 at the center point C0. Accordingly, the resemblance index with the image F60 at the center point C0 is the highest with respect to the face image F61 closest to the center point C0, and becomes lower with respect to the images far from the center point C0. Then, if the image F60 at the center point C0 is the camera image, the resemblance index with each of the face images F61, F62, ... is changed depending on an orientation and an expression of the face, so that the position of each of the face images F61, F62, ... is changed in real time on the resemblance index screen as well.

Figure 30:
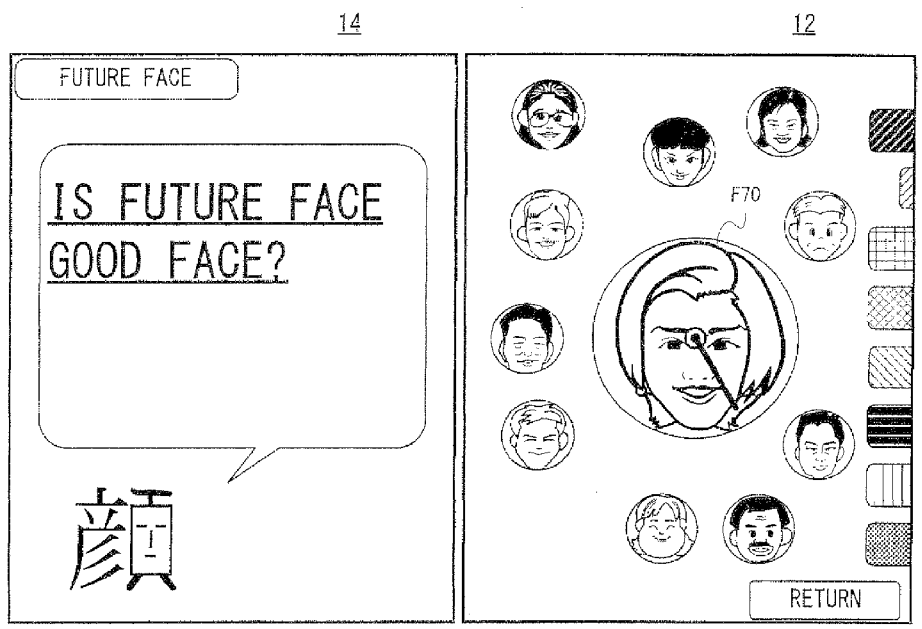
FIG. 30 is an illustrative view showing one example of a game screen to perform a future face determination.

Moreover, when the "future face" determination button B4 is pressed on the main game screen, the game screen is updated to a future face screen as shown in FIG. 30. On the future face screen, the image F70 which is selected on the main game screen is displayed in a giant size, and with respect to the face of the image F70, changes of the positions of the feature points P1-P55 due to aging are estimated for each five years, and the looking is changed for each three seconds, for example, on the basis of the estimation result. This makes it possible to briefly show the changes of an arbitrary face over fifty years in 30 seconds.

As understood from the above description, the game apparatus 10 of this embodiment displays images (face images F1, F2, ...) which are divided into a plurality of groups on the screen (LCD 12, 14). The computer (CPU 42, main memory 48) of the game apparatus 10 displays, at each area (box 90a, 90b, ...) corresponding to each group in the storing region 90 to store images within the screen, the images belonging to the group (S9), and selects any one of the plurality of groups in response to an operation by the user (S19). Then, when any group is selected, the images belonging to the selected group are displayed in the active box 92A to allow the user to operate images within the screen (S31). Thus, the user can easily search and operate the images belonging to a specific group.

Additionally, the game apparatus 10 successively images the user with the camera 16 (S3, S103, S207, S303), makes an evaluation of the first image data indicating the image (F0) obtained by successive imaging (S117, S218, S321, S329), and successively updates and displays the evaluation result on the screen (S102, 5117, 5206, 5219, 5302, S321, S329). Thus, it is possible to allow the user to recognize the evaluation result obtained by imaging with different expressions and angles without the need of complex operations.

Here, in this embodiment, the touch panel 28 is only provided to only the LCD 12, but in another embodiment, this may be provided to the LCD 14. Furthermore, in place of the touch panel 28, or in addition thereto, various pointing devices (position designating means for designating an arbitrary position within the screen), such as a mouse, a track ball, a touch pad, and a DPD (Direct Pointing Device) can be utilized.

In this embodiment, the game apparatus 10 is explained, but the technology presented herein can be applied to a display controlling apparatus to display images which are divided into a plurality of groups. Furthermore, the technology presented herein can be applied to an information processing apparatus for evaluating the user by utilizing the image obtained by imaging the user.

Although the technology presented herein has been described and illustrated in detail, it is clearly understood that the same is by way of illustration and example only and is not to be taken by way of limitation, the spirit and scope of the present technology being limited only by the terms of the appended claims.

What is claimed is:

1. A non-transitory storage medium storing an information processing program, wherein said information processing program causes a computer of an information processing apparatus to execute:
   imaging, for subsequently imaging a user with a camera;
   evaluating, for making an evaluation of first image data indicating an image obtained through the subsequent imaging by said imaging; and
   evaluation result displaying, for displaying an evaluation result on a screen by said evaluating through subsequent updating, wherein
   said information processing program causes said computer to further execute
   storing, for previously storing second image data indicating an image of a party to be evaluated different than the user, and
   said evaluating evaluates a relationship between said user and said party to be evaluated on the basis of said first data indicating the images obtained through the subsequent imaging by said imaging and said second image data stored in said storing, wherein
   based on the evaluated relationship between said user and said party to be evaluated, a displayed position on said screen of the image of said party to be evaluated changes relatively to a displayed position of the image of said user, wherein
   the distance between the image of said party to be evaluated and the image of said user is proportional to the degree of the evaluated relationship.

2. The non-transitory storage medium storing an information processing program according to claim 1, wherein
   said evaluation result displaying moves and displays the image obtained through the subsequent imaging by said imaging on the basis of the evaluation result by said evaluating.

3. The non-transitory storage medium storing an information processing program according to claim 1, wherein
   said evaluation result displaying moves and displays the image of said party to be evaluated on the basis of the evaluation result by said evaluating.

4. The non-transitory storage medium storing an information processing program according to claim 1, wherein
   said information processing program causes said computer to further execute:
   map displaying, for displaying a map in association with an evaluation content made by said evaluating on said screen; and
   mapping, for mapping the image obtained by said imaging through the subsequent imaging at a position on said map corresponding to the evaluation result by said evaluating.

5. The non-transitory storage medium storing an information processing program according to claim 1, wherein
   said information processing program causes said computer to further execute:
   display position deciding, for deciding a position corresponding to a position on an axis in association with an evaluation content within said screen on the basis of the evaluation result by said evaluating, and said evaluation result displaying displays an image in association with said evaluation content at a predetermined position on said axis, and displays the image obtained through the subsequent imaging by said imaging at the position decided by said display position deciding.

6. The non-transitory storage medium storing an information processing program according to claim 1, wherein
said information processing program causes said computer to further execute:
display target position deciding, for deciding a target position corresponding to a position on an axis in association with an evaluation content within said screen on the basis of the evaluation result by said evaluating, and
said evaluation result displaying displays an image in association with said evaluation content at a predetermined position on said axis, and gradually moving the image obtained through the subsequent imaging by said imaging toward the target position decided by said display target position deciding, and displaying the same.

7. The non-transitory storage medium storing an information processing program according to claim 1, wherein
said information processing program causes said computer to further execute:
display position deciding, for deciding a position to display the image obtained through the imaging by said imaging on the basis of the evaluation result by said evaluating and a predetermined position within said screen, and
said evaluation result displaying displays the image of said party to be evaluated at said predetermined position, and displays the image obtained through the imaging by said imaging at the position decided by said display position deciding.

8. The non-transitory storage medium storing an information processing program according to claim 1, wherein
said information processing program causes said computer to further execute:
display position deciding for deciding a position to display the image of said party to be evaluated on the basis of the evaluation by said evaluating and a predetermined position within said screen, and
said evaluation result displaying displays the image obtained through the imaging by said imaging at said predetermined position, and displays the image of said party to be evaluated at the position decided by said display position deciding.

9. The non-transitory storage medium storing an information processing program according to claim 1, wherein
said information processing program causes said computer to further execute:
display target position deciding, for deciding a target position to display the image obtained through the imaging by said imaging on the basis of the evaluation result by said evaluating and a predetermined position within said screen, and
said evaluation result displaying displays the image of said party to be evaluated at said predetermined position, and gradually moving the image obtained through the subsequent imaging by said imaging toward the target position decided by said display target position deciding and displaying the same.

10. The non-transitory storage medium storing an information processing program according to claim 1, wherein
said information processing program causes said computer to further execute:
display target position deciding, for deciding a target position to display the image of said party to be evaluated on the basis of the evaluation result by said evaluating and a predetermined position within said screen, and
said evaluation result displaying displays the image obtained through the imaging by said imaging at said predetermined position, and gradually moving the image of said party to be evaluated toward the target position decided by said display target position deciding and displays the same.

11. The non-transitory storage medium storing an information processing program according to claim 7, wherein
said display position deciding decides a position to display the image obtained through the imaging by said imaging such that said predetermined position where the image of said party to be evaluated is displayed and the position where the image obtained through the imaging by said imaging is displayed are close to each other with increases in relationship evaluated by said evaluating.

12. The non-transitory storage medium storing an information processing program according to claim 1, wherein
said information processing program causes said computer to further execute:
third image data storing, for previously storing third image data indicating an image of a person except for said user; and
other person evaluating, for making an evaluation of the third image data stored in said third image data storing, and
said evaluation result displaying moves and displays the image obtained through subsequent imaging by said imaging on the basis of the evaluation result by said evaluating, and moves and displays the image of the person except for said user on the basis of the evaluation result by said other person evaluating.

13. The non-transitory storage medium storing an information processing program according to claim 1, wherein
said information processing program causes said computer to further execute:
third image data storing, for previously storing third image data indicating an image of other person different from said user and said party to be evaluated; and
other person evaluating, for evaluating a relationship between said other person and said party to be evaluated on the basis of the second image data stored by said storing and the third image data stored by said third image data storing, and
said evaluation result displaying moves and displays the image obtained through the subsequent imaging by said imaging on the basis of the evaluation result by said evaluating, and moves and displays the image of said other person different from said user and said party to be evaluated on the basis of the evaluation result by said other person evaluating.

14. The non-transitory storage medium storing an information processing program according to claim 13, wherein
said information processing program causes said computer to further execute:
dividing, for dividing a plurality of third image data into a plurality of groups; and
selecting, for selecting at least one group out of said plurality of groups, and
said evaluation result displaying moves and displays the image obtained through subsequent imaging by said imaging on the basis of the evaluation result by said evaluating, and displays in a recognizable manner an image corresponding to the third image data belonging to the group selected by said selecting out of images of other persons different from said user and said party to be evaluated on the basis of the evaluation result by said other person evaluating.

15. An information processing apparatus, comprising:

an imager for subsequently imaging a user; and a computer configured to perform at least:

making an evaluation of first image data indicating an image obtained through the subsequent imaging by said imager;

displaying an evaluation result of said first image data on a screen through subsequent updating, and storage, for previously storing second image data indicating an image of a party to be evaluated different than the user wherein said computer evaluates a relationship between said user and said party to be evaluated on the basis of said first image data indicating the images obtained through the subsequent imaging by said imager and said second image data stored in said storage, wherein based on the evaluated relationship between said user and said party to be evaluated, a displayed position on said screen of the image of said party to be evaluated changes relatively to a displayed position of the image of said user, wherein the distance between the image of said party to be evaluated and the image of said user is proportional to the degree of the evaluated relationship.

16. A method of making an evaluation based on an image by utilizing an information processing apparatus and informing a user of an evaluation result, comprising:

imaging, for subsequently imaging a user with a camera;

evaluating, for making an evaluation of first image data indicating an image obtained by the subsequent imaging by said imaging;

evaluation result displaying, for displaying an evaluation result on a screen by said evaluating through subsequent updating, and storing, for previously storing second image data indicating an image of a party to be evaluated different than the user, wherein said evaluating evaluates a relationship between said user and said party to be evaluated on the basis of said first image data indicating the images obtained through the subsequent imaging by said imaging and said second image data stored in said storing, wherein based on the evaluated relationship between said user and said party to be evaluated, a displayed position on said screen of the image of said party to be evaluated changes relatively to a displayed position of the image of said user, wherein the distance between the image of said party to be evaluated and the image of said user is proportional to the degree of the evaluated relationship.

\* \* \* \* \*